United States Patent
Karjala et al.

(10) Patent No.: US 10,759,927 B1
(45) Date of Patent: Sep. 1, 2020

(54) ETHYLENE-BASED POLYMERS AND PROCESSES TO MAKE THE SAME

(71) Applicant: DOW GLOBAL TECHNOLOGIES LLC, Midland, MI (US)

(72) Inventors: Teresa P. Karjala, Lake Jackson, TX (US); Lori L. Kardos, Sugar Land, TX (US); Hayley A. Brown, Houston, TX (US); David T. Gillespie, Pearland, TX (US); Zachary L. Polk, Pearland, TX (US); Jose Ortega, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 255 days.

(21) Appl. No.: 16/076,131

(22) PCT Filed: Feb. 16, 2017

(86) PCT No.: PCT/US2017/018091
§ 371 (c)(1),
(2) Date: Aug. 7, 2018

(87) PCT Pub. No.: WO2017/146981
PCT Pub. Date: Aug. 31, 2017

Related U.S. Application Data

(60) Provisional application No. 62/298,741, filed on Feb. 23, 2016.

(51) Int. Cl.
*C08L 23/06* (2006.01)
*C08F 10/02* (2006.01)
*C08F 110/02* (2006.01)

(52) U.S. Cl.
CPC .............. *C08L 23/06* (2013.01); *C08F 10/02* (2013.01); *C08F 110/02* (2013.01); *C08F 2500/12* (2013.01); *C08L 2207/066* (2013.01)

(58) Field of Classification Search
None
See application file for complete search history.

(56) References Cited

U.S. PATENT DOCUMENTS

| | | | |
|---|---|---|---|
| 7,741,415 | B2 | 6/2010 | Conrad et al. |
| 8,415,422 | B2 | 4/2013 | Schuetz et al. |
| 8,871,876 | B2 | 10/2014 | Berbee et al. |
| 8,871,887 | B2 | 10/2014 | Karjala et al. |
| 8,916,667 | B2 | 12/2014 | Karjala et al. |
| 9,068,032 | B2 | 6/2015 | Karjala et al. |

(Continued)

FOREIGN PATENT DOCUMENTS

| | | |
|---|---|---|
| EP | 2239283 B1 | 1/2012 |
| WO | 0009594 A1 | 2/2000 |

(Continued)

OTHER PUBLICATIONS

International Search Report and Written Opinion pertaining to PCT/US2017/018091 dated May 31, 2017.

(Continued)

*Primary Examiner* — Richard A Huhn
(74) *Attorney, Agent, or Firm* — Dinsmore & Shohl LLP

(57) ABSTRACT

The invention provides a composition comprising an ethylene-based polymer, wherein the ethylene-based polymer comprises the following properties: a) a Mw(abs)/Mw(conv)>2.60; and b) a $CDFR_{IR}$ (at Mw<10,000 g/mole)>0.145.

10 Claims, 3 Drawing Sheets

(56) References Cited

U.S. PATENT DOCUMENTS

| | | |
|---|---|---|
| 9,243,087 B2 | 1/2016 | Karjala et al. |
| 2008/0125553 A1 | 5/2008 | Conrad et al. |
| 2010/0317804 A1 | 12/2010 | Karjala et al. |
| 2011/0178253 A1 | 7/2011 | Karjala et al. |
| 2012/0130019 A1 | 5/2012 | Karjala et al. |
| 2013/0184419 A1 | 7/2013 | Berbee et al. |
| 2013/0261265 A1 | 10/2013 | Karjala et al. |
| 2014/0094533 A1 | 4/2014 | Karjala et al. |
| 2014/0094583 A1 | 4/2014 | Karjala et al. |
| 2014/0275462 A1 | 9/2014 | Yang et al. |
| 2014/0288257 A1 | 9/2014 | Zschoch et al. |
| 2014/0316094 A1 | 10/2014 | Berbee et al. |
| 2014/0316096 A1 | 10/2014 | Berbee et al. |
| 2015/0274856 A1 | 10/2015 | Berbee et al. |
| 2016/0083568 A1 | 3/2016 | den Doelder et al. |
| 2016/0090476 A1 | 3/2016 | den Doelder et al. |

FOREIGN PATENT DOCUMENTS

| | | |
|---|---|---|
| WO | 2006049783 A1 | 5/2006 |
| WO | 2009114661 A1 | 9/2009 |
| WO | 2010042390 A1 | 4/2010 |
| WO | 2010144784 A1 | 12/2010 |
| WO | 2011019563 A1 | 2/2011 |
| WO | 201082393 A1 | 6/2012 |
| WO | 2014179469 A1 | 11/2014 |
| WO | 2014190036 A1 | 11/2014 |
| WO | 2014190039 A1 | 11/2014 |
| WO | 2014190041 A1 | 11/2014 |
| WO | 2015094566 A1 | 6/2015 |

OTHER PUBLICATIONS

Balke et al. "A Strategy for Interpreting Multidetector Size-Exclusion Chromatography Data II", Chromatography of Polymers, 1992, Chapter 13.

Mourey et al., "A Strategy for Interpreting Multidetector Size-Exclusion Chromatography Data I", Chromatography of Polymers, 1992, Chapter 12.

Zimm, Bruno H., "Apparatus and Methods for Measurement and Interpretation of the Angular Variation of Light Scattering; Preliminary Results on Polystyrene Solutions", The Journal of Chemical Physics, 1948, 16:12, 1099.

Kratochvil, "Fundamental Light-Scattering Methods", Classical Light Scattering from Polymer Solutions, 1987, 113.

Yau, Wallace W., "Examples of Using 3D-GPC-TREF for Polyolefin Characterization", Macromol. Symp. 2007, 257, 29-45.

ETHYLENE-BASED POLYMERS AND
PROCESSES TO MAKE THE SAME

REFERENCE TO RELATED APPLICATIONS

The present application claims the benefit of U.S. Provisional Application 62/298,741, filed Feb. 23, 2016.

BACKGROUND OF THE INVENTION

Blown film production lines are typically limited in output by bubble stability. Blending Linear Low Density Polyethylene (LLDPE) with 0.5 wt %-90 wt % of Low Density Polyethylene (LDPE) increases bubble stability, in part due to the higher melt strength of the LDPE. The increase in melt strength, in part, provides for an increase in film output. High melt strength resins also typically have reduced optics and toughness properties. Thus, there is a need for new ethylene-based polymers, such as LDPEs, that have an optimized balance of melt strength and film properties, such as shrink, for blown film applications. LDPE polymers are disclosed in the following references: WO 2010/042390, WO 2010/144784, WO 2011/019563, WO 2012/082393, WO 2006/049783, WO 2009/114661, WO 2014/190039, WO 2014/190041, WO 2014/190036, WO 2014/179469, WO 2015/094566, US 2008/0125553, US 2014/0316096, US 2014/0316094, US 2014/0288257, US 2015/0274856, U.S. Pat. Nos. 7,741,415, 8,871,876, 8,415,422, 8,871,887, 8,916,667, 9,243,087, 9,068,032 and EP 2239283B1. However, such polymers do not provide an optimized balance of high melt strength, improved blown film maximum output, and excellent film properties. Thus, as discussed above, there remains a need for new ethylene-based polymers, such as LDPEs, that have an optimized balance of melt strength, output and film properties. These needs and others have been met by the following invention.

SUMMARY OF THE INVENTION

The invention provides a composition comprising an ethylene-based polymer, which comprises the following properties:
a) a Mw(abs)/Mw(conv) ≥2.60; and
b) a CDF (at MW ≤10,000 g/mole) ≥0.145.

DETAILED DESCRIPTION

Figure 1:
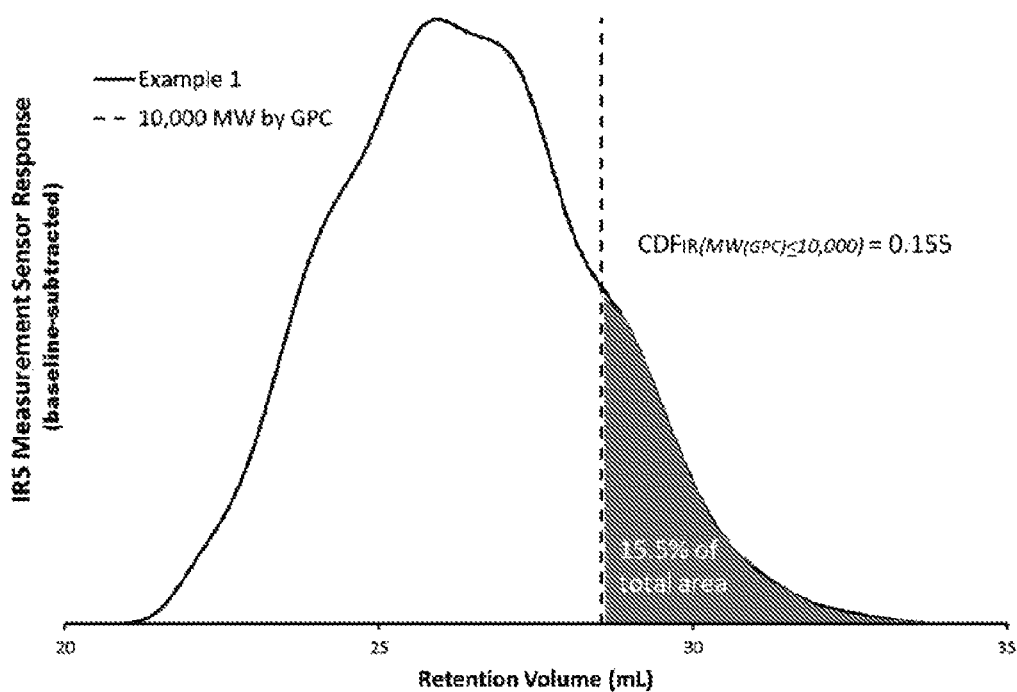
FIG. 1 depicts a chromatogram for the $CDF_{IR}$ determination of Example 1.

Novel ethylene-based polymers, such as LDPEs, were developed with an optimized balance of high melt strength, improved blown film maximum output, and excellent film properties. The high melt strength allows an increase in the processability and output of the inventive polymers and blends containing the same.

As discussed above, the invention provides a composition comprising an ethylene-based polymer, which comprises the following properties:
a) a Mw(abs)/Mw(conv) ≥2.60; and
b) a $CDF_{IR}$ (at MW ≤10,000 g/mole) ≥0.145.

The composition may comprise a combination of two or more embodiments as described herein. The ethylene-based polymer may comprise a combination of two or more embodiments as described herein.

In one embodiment, the ethylene-based polymer has a $CDF_{IR}$ (at MW ≤10,000 g/mole) ≥0.140, or ≥0.142, or ≥0.145, or ≥0.148, or ≥0.150, or ≥0.153, or ≥0.155, or ≥0.160, or ≥0.165. In a further embodiment, the ethylene-based polymer is a LDPE. A LDPE is known in the art, and refers to an ethylene homopolymer prepared using a free-radical, high pressure (≥100 MPa (for example, 100-400 MPa)) polymerization. In one embodiment, the ethylene-based polymer has a $CDF_{IR}$ (at MW ≤10,000 g/mole) ≤0.250, or ≤0.245, or ≤0.240, or ≤0.235, or ≤0.230, or ≤0.225, or ≤0.220, ≤0.215, ≤0.210, or ≤0.205, or ≤0.200, or ≤0.195, or ≤0.190. In a further embodiment, the ethylene-based polymer is a LDPE.

In one embodiment, the ethylene-based polymer has a $CDF_{LS}$ (at MW ≥750,000 g/mole) ≥0.400, or ≥0.410, or ≥0.420, or ≥0.430, or ≥0.440, or ≥0.450, or ≥0.460, or ≥0.470, or ≥0.480, or ≥0.490, or ≥0.500, or ≥0.510, or ≥0.520, or ≥0.522, or ≥0.525. In a further embodiment, the ethylene-based polymer is a LDPE. In one embodiment, the ethylene-based polymer has a $CDF_{LS}$ (at MW ≥750,000 g/mole) ≤0.700, or ≤0.690, or ≤0.680, or ≤0.670, or ≤0.660, or ≤ or 0.650, or ≤0.640, or ≤0.630 or ≤0.620, or ≤0.610, or ≤0.600. In a further embodiment, the ethylene-based polymer is a LDPE.

In one embodiment, the ethylene-based polymer has a $CDF_{DV}$ (at MW ≥1,200,000 g/mole) ≥0.005, or ≥0.010, or ≥0.015, or ≥0.020, or ≥0.025, or ≥0.030, or ≥0.035, or ≥0.040. In a further embodiment, the ethylene-based polymer is a LDPE. In one embodiment, the ethylene-based polymer has a $CDF_{DV}$ (at MW ≥1,200,000 g/mole) ≤0.150, or ≤0.145, or ≤0.140, or ≤0.135, or ≤0.130, or ≤0.125. In one embodiment, the ethylene-based polymer has a $CDF_{DV}$ (at MW ≥1,200,000 g/mole) ≤0.120, or ≤0.115, or ≤0.110, ≤0.105, or ≤0.100, or ≤0.095, or ≤0.090, or ≤0.085. In a further embodiment, the ethylene-based polymer is a LDPE.

In one embodiment, the ethylene-based polymer has a Mw (Absolute by Light Scattering on-line by GPC) from 400,000 g/mol to 600,000 g/mol. In a further embodiment, the ethylene-based polymer is a LDPE.

In one embodiment, the ethylene-based polymer has an intrinsic viscosity (Absolute by viscometer on-line by GPC) or IV (bulk) ≥1.00 dl/g, further >1.10 dl/g. In a further embodiment, the ethylene-based polymer is a LDPE.

In one embodiment, the ethylene-based polymer has an Mw(abs)/Mw(conv) ratio ≥2.62, or ≥2.65, or ≥2.68, or ≥2.70. In a further embodiment, the ethylene-based polymer is a LDPE. In one embodiment, the ethylene-based polymer has an Mw(abs)/Mw(conv) ratio from 2.60 to 5.00, further from 2.60 to 4.50, further from 2.60 to 4.00, further from 2.60 to 3.50, and further from 2.60 to 3.00. In a further embodiment, the ethylene-based polymer is a LDPE.

In one embodiment, the polymer has a GPC Mw(conv) from 75,000 g/mol to 250,000 g/mol, further from 100,000 to 200,000 g/mol, further from 125,000 g/mol to 175,000 g/mol, and further from 150,000 to 175,000 g/mol. In a further embodiment, the ethylene-based polymer is a LDPE.

In one embodiment, the polymer has a Mw(conv)/Mn (conv) ≥8.5, or ≥9.0, or ≥9.5. In a further embodiment, the ethylene-based polymer is a LDPE. In one embodiment, the polymer has a Mw(conv)/Mn(conv) ≤15.0, or ≤14.0, or ≤13.0. In a further embodiment, the ethylene-based polymer is a LDPE. In one embodiment, the polymer has a Mw(conv)/Mn(conv) from 8.5 to 15.0, further from 8.5 to 12.0, further from 10.0 to 11.0. In a further embodiment, the ethylene-based polymer is a LDPE.

In one embodiment, the polymer has a Mn(conv) from 10,000 to 20,000 g/mol, further from 12,500 g/mol to 17,500 g/mol, further from 14,000 g/mol to 17,000 g/mol, and further from 15,000 g/mol to 16,000 g/mol. In a further embodiment, the ethylene-based polymer is a LDPE.

In one embodiment, the ethylene-based polymer has a z-average molecular weight Mz(conv) ≥550,000 g/mole, or ≥600,000 g/mole, or ≥650,000 g/mole. In a further embodiment, the ethylene-based polymer is a LDPE. In one embodiment, the ethylene-based polymer has a z-average molecular weight Mz(conv) ≤800,000 g/mole, or ≤750,000 g/mole. In a further embodiment, the ethylene-based polymer is a LDPE. In one embodiment, the polymer has a Mz(conv) from 500,000 to 1,000,000 g/mol, further from 600,000 g/mol to 800,000 g/mol, and further from 650,000 g/mol to 750,000 g/mol. In a further embodiment, the ethylene-based polymer is a LDPE. In one embodiment, the ethylene-based polymer has an Mz(conv) from 550,000 to 800,000 g/mole, further from 600,000 to 750,000 g/mole, further from 650,000 to 750,000 g/mole. In a further embodiment, the ethylene-based polymer is a LDPE.

In one embodiment, the polymer has a Mw(abs) from 325,000 g/mol to 700,000 g/mol, further from 350,000 g/mol to 600,000 g/mol, further from 400,000 g/mol to 500,000 g/mol, and further from 425,000 g/mol to 500,000 g/mol. In a further embodiment, the ethylene-based polymer is a LDPE. In one embodiment, the polymer has a Mz(abs) from 4,000,000 g/mol to 7,000,000 g/mol, further from 4,500,000 g/mol to 6,500,000 g/mol, further from 4,000,000 g/mol to 6,000,000 g/mol, and further from 4,250,000 g/mol to 6,000,000 g/mol. In a further embodiment, the ethylene-based polymer is a LDPE. In one embodiment, the ethylene-based polymer has a Mz(abs)/Mw(abs) from 6.0 to 15.0, further from 8.0 to 14.0, further from 10.0 to 13.0, and further from 11.0 to 12.0. In a further embodiment, the ethylene-based polymer is a LDPE.

In one embodiment, the ethylene-based polymer has a gpcBR value from 2.3 to 5.0, further from 2.5 to 4.5, further from 2.8 to 4.0, further from 2.8 to 3.5. In a further embodiment, the ethylene-based polymer is a LDPE. In one embodiment, the ethylene-based polymer has a gpcBR value from 2.0 to 4.0, or from 2.5 to 3.5, or from 2.8 to 3.4. In a further embodiment, the ethylene-based polymer is a LDPE. In one embodiment, the ethylene-based polymer has an LCBf value from 2.5 to 5.0, further from 2.75 to 4.5, further from 3.0 to 4.3, further from 3.4 to 4.1. In a further embodiment, the ethylene-based polymer is a LDPE.

In one embodiment, the ethylene-based polymer has a melt viscosity at 0.1 rad/s and 190° C. ≥30,000 Pa·s, further ≥32,000 Pa·s (at 190° C.). In a further embodiment, the ethylene-based polymer is a LDPE. In one embodiment, the ethylene-based polymer has a melt viscosity at 0.1 rad/s and 190° C. ≤50,000 Pa·s, further ≤45,000 Pa·s, further ≤41,000 Pa·s (at 190° C.). In a further embodiment, the ethylene-based polymer is a LDPE.

In one embodiment, the ethylene-based polymer has a melt viscosity ratio (V0.1/V100), at 190° C., ≥40, or ≥45, or ≥50. In a further embodiment, the ethylene-based polymer is a LDPE. In one embodiment, the ethylene-based polymer has a viscosity ratio (V0.1/V100, at 190° C.) from 40 to 60, more preferably from 43 to 55, most preferably from 45 to 54, most preferably from 45 to 50. In a further embodiment, the ethylene-based polymer is a LDPE.

In one embodiment, the ethylene-based polymer has a tan delta (measured at 0.1 rad/s at 190° C.) ≤2.0, further ≤1.8, further ≤1.5, and further ≤1.4. In a further embodiment, the ethylene-based polymer is a LDPE. In one embodiment, the ethylene-based polymer has a tan delta (measured at 0.1 rad/s at 190° C.) from 0.5 to 2.0, further from 0.8 to 1.8, further from 1.0 to 1.5, and further from 1.1 to 1.4. In a further embodiment, the ethylene-based polymer is a LDPE.

In one embodiment, the ethylene-based polymer has a peak melt strength (MS) >20.0 cN, preferably >22.0 cN, preferably >24.0 cN. In a further embodiment, the ethylene-based polymer is a LDPE.

In one embodiment, the ethylene-based polymer has a peak melt strength at 190° C. of greater than −65*(I$_2$ at 190° C.)+34 cN. Here, the unit of the "65 coefficient" is as follows: "(cN)/(g/10 min)". In one embodiment, the ethylene-based polymer has a peak melt strength at 190° C. of greater than −65*(I$_2$ at 190° C.)+34 cN and less than −65*(I$_2$ at 190° C.)+43 cN. In a further embodiment, the ethylene-based polymer is a LDPE.

In one embodiment, the ethylene-based polymer has a melt index (I2) from 0.01 to 10 g/10 min, further from 0.05 to 7.0 g/10 min, further from 0.1 to 5.0 g/10 min. In a further embodiment, the ethylene-based polymer is a LDPE. In one embodiment, the ethylene-based polymer has a melt index (I2) from 0.01 to 1.5 g/10 min, further from 0.05 to 1.0 g/10 min, and further from 0.05 to 0.50 g/10 min. In a further embodiment, the ethylene-based polymer is a LDPE. In one embodiment, the ethylene-based polymer has a melt index (I2) from 0.01 to 1.00 g/10 min, further from 0.01 to 0.70 g/10 min, further from 0.01 to 0.50 g/10 min, further from 0.01 to 0.40 g/10 min. In a further embodiment, the ethylene-based polymer is a LDPE.

In one embodiment, the ethylene-based polymer has a melt index (I2) ≤1.0, further ≤0.5. In a further embodiment, the ethylene-based polymer is a LDPE. In one embodiment, the ethylene-based polymer has a melt index (I2) from 0.015 to 1.0 g/10 min, further from 0.02 to 0.5 g/10 min, further from 0.05 to 0.4 g/10 min, and further from 0.1 to 0.35 g/10 min. In a further embodiment, the ethylene-based polymer is a LDPE. In one embodiment, the ethylene-based polymer has a melt index (I2) from 0.02 to 1.0 g/10 min, further from 0.05 to 0.5 g/10 min, further from 0.1 to 0.4 g/10 min, and further from 0.15 to 0.35 g/10 min. In a further embodiment, the ethylene-based polymer is a LDPE.

In one embodiment, the ethylene-based polymer has a density from 0.910 to 0.940 g/cc, further from 0.910 to 0.930 g/cc, further from 0.915 to 0.925 g/cc, further from 0.916 to 0.922 g/cc, further from 0.918 to 0.921 g/cc, and further from 0.919 to 0.921 g/cc (1 cc=1 cm$^3$). In a further embodiment, the ethylene-based polymer is a LDPE.

In one embodiment, the ethylene-based polymer has a % hexane extractables from 1.0 to 4.0 wt %, further from 1.6 to 2.6 wt %, further from 1.8 to 2.4 wt %, and further from 1.9 to 2.2 wt %, based on the weight of the polymer. In a further embodiment, the ethylene-based polymer is a LDPE.

In one embodiment, the ethylene-based polymer has ≥0.1 amyl groups (C5) per 1000 total carbon atoms, as determined by $^{13}$C NMR. In a further embodiment, the ethylene-based polymer is a LDPE. In one embodiment, the ethylene-based polymer has ≥0.2 amyl (C5) groups (branches) per 1000 total carbon atoms, further ≥0.5 amyl groups per 1000 total carbon atoms, further ≥1 amyl groups per 1000 total carbon atoms, further ≥1.5 amyl groups per 1000 total carbon atoms, further ≥1.75 amyl groups per 1000 total carbon atoms, and further ≥2.0 amyl groups per 1000 total carbon atoms, in which the amyl group is equivalent to the C5 group and is measured by $^{13}$C NMR. In a further embodiment, the ethylene-based polymer is a LDPE.

In one embodiment, the ethylene-based polymer has from 0.1 to 1.5 C1 (methyl groups) per 1000 total carbon atoms, further from 0.2 to 1.0 C1 (methyl) per 1000 total carbon atoms, and further from 0.3 to 0.5 C1 (methyl) per 1000 total carbon atoms, as determined by $^{13}$C NMR. In a further embodiment, the ethylene-based polymer is a LDPE. In one embodiment, the ethylene-based polymer has from 4.0 to 6.0 of 1,3 diethyl branches per 1000 total carbon atoms, further from 4.1 to 5.0 of 1,3 diethyl branches per 1000 total carbon atoms, and further from 4.2 to 4.7 of 1,3 diethyl branches per 1000 total carbon atoms, as determined by $^{13}$C NMR. In a further embodiment, the ethylene-based polymer is a LDPE.

In one embodiment, the ethylene-based polymer has from 1.0 to 3.0 C2 on the quaternary carbon atom per 1000 total carbon atoms, further from 1.4 to 2.0 C2 on the quaternary carbon atom per 1000 total carbon atoms, and further from 1.45 to 1.7 C2 on the quaternary carbon atom per 1000 total carbon atoms, as determined by $^{13}$C NMR. In a further embodiment, the ethylene-based polymer is a LDPE.

In one embodiment, the ethylene-based polymer has from 0.04 to 0.09 vinyls per 1000 total carbon atoms, further from 0.04 to 0.08 vinyls per 1000 total carbon atoms, and further from 0.05 to 0.08 vinyls per 1000 total carbon atoms, as determined by 1H NMR. In a further embodiment, the ethylene-based polymer is a LDPE. In one embodiment, the ethylene-based polymer has from 0.03 to 0.06 cis and trans groups (vinylene) per 1000 total carbon atoms, and further from 0.03 to 0.05 cis and trans per 1000 total carbon atoms, as determined by 1H NMR. In a further embodiment, the ethylene-based polymer is a LDPE. In one embodiment, the ethylene-based polymer has from 0.1 to 0.4 vinylidene per 1000 total carbon atoms, and further from 0.1 to 0.3 vinylidene per 1000 total carbon atoms, as determined by 1H NMR. In a further embodiment, the ethylene-based polymer is a LDPE.

In one embodiment, the ethylene-based polymer has a crystallization temperature from 98.5° C. to 100.0° C., and further from 98.7° C. to 99.5° C. In a further embodiment, the ethylene-based polymer is a LDPE.

In one embodiment, the ethylene-based polymer is formed in a high pressure (P greater than 100 MPa), free radical polymerization process. In a further embodiment, the ethylene-based polymer is a LDPE. In one embodiment, the ethylene-based polymer is formed in at least one tubular reactor.

In one embodiment, the ethylene-based polymer is a low density polyethylene (LDPE).

In one embodiment, the ethylene-based polymer is present at greater than, or equal to, 10 weight percent, based on the weight of the composition. In a further embodiment, the ethylene-based polymer is a LDPE. In one embodiment, the ethylene-based polymer is present in an amount from 10 to 50 weight percent, further from 20 to 40 weight percent, based on the weight of the composition. In a further embodiment, the ethylene-based polymer is a LDPE. In one embodiment, the ethylene-based polymer is present in an amount from 60 to 90 weight percent, further from 65 to 85 weight percent, based on the weight of the composition. In a further embodiment, the ethylene-based polymer is a LDPE.

In one embodiment, the ethylene-based polymer is present in an amount from 1 to 10 weight percent, further from 1.5 to 5 weight percent, based on the weight of the composition. In a further embodiment, the ethylene-based polymer is a LDPE.

In one embodiment, the composition further comprises another ethylene-based polymer. Suitable other ethylene-based polymers include, but are not limited to, DOWLEX Polyethylene Resins, TUFLIN Linear Low Density Polyethylene Resins, ELITE or ELITE AT Enhanced Polyethylene Resins, or INNATE Precision Packaging Resins (all available from The Dow Chemical Company), high density polyethylenes (d ≥0.96 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises another ethylene-based polymer that differs in one or more properties, such as density, melt index, comonomer, comonomer content, from the inventive ethylene-based polymer. Suitable other ethylene-based polymers include, but are not limited to, DOWLEX Polyethylene Resins (LLDPEs), TUFLIN Linear Low Density Polyethylene Resins, ELITE or ELITE AT Enhanced Polyethylene Resins, or INNATE Precision Packaging Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and EVA (ethylene vinyl acetate).

In one embodiment, the composition further comprises a propylene-based polymer. Suitable propylene-based polymers include polypropylene homopolymers, propylene/α-olefin interpolymers, and propylene/ethylene interpolymers. In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.89 to 0.94 g/cc, further from 0.90 to 0.93 g/cc. In a further embodiment, the composition comprises 1 to 99 weight percent, further from 15 to 85 weight percent, of the inventive ethylene-based polymer, based on the weight of the composition. In one embodiment, the composition comprises <1.0 wt %, or <0.5 wt %, or <0.2 wt %, or <0.1 wt %, or <0.05 wt %, or <0.02 wt %, or <0.01 wt % of a propylene-based polymer, based on the weight of the composition.

In one embodiment, the composition comprises <5 ppm, further <2 ppm, further <1 ppm, and further <0.5 ppm sulfur, based on the weight of the composition. In one embodiment, the composition does not contain sulfur.

In one embodiment, the composition comprises from 1.5 to 80 weight percent of an inventive ethylene-based polymer. In a further embodiment, the composition further comprises a LLDPE (Linear Low Density Polyethylene). In one embodiment, the composition comprises from 1.5 to 20 weight percent of an inventive ethylene-based polymer. In a further embodiment, the composition further comprises a LLDPE. In one embodiment, the composition comprises from 20 to 80 weight percent, further from 50 to 80 weight percent of an inventive ethylene-based polymer, based on the weight of the composition. In a further embodiment, the composition further comprises a LLDPE.

An inventive composition may comprise a combination of two or more embodiments as described herein.

The invention also provides an article comprising at least one component formed from an inventive composition. In a further embodiment, the article is a film. In another embodiment, the article is a coating.

The invention also provides a process for forming a polymer of any of the previous embodiments, the process comprising polymerizing a mixture comprising ethylene, in at least one tubular reactor. The invention also provides a process for forming an inventive ethylene-based polymer of any of the previous embodiments, the process comprising polymerizing a mixture comprising ethylene, in a combination of at least one tubular reactor and at least one autoclave reactor.

An inventive composition may comprise a combination of two or more embodiments as described herein. An inventive ethylene-based polymer may comprise a combination of two or more embodiments as described herein. An inventive LDPE may comprise a combination of two or more embodiments as described herein.

An inventive article may comprise a combination of two or more embodiments as described herein. An inventive film may comprise a combination of two or more embodiments as described herein. An inventive process may comprise a combination of two or more embodiments as described herein.

Process

For producing an inventive ethylene-based polymer, including an inventive LDPE, a high pressure, free-radical initiated polymerization process is typically used. Typically, a jacketed tube is used as a reactor, which has one or more reaction zones. Suitable, but not limiting, reactor lengths may be from 100 to 3000 meters (m), or from 1000 to 2000 meters. The beginning of a reaction zone for the reactor is typically defined by the side injection of initiator of the reaction, ethylene, chain transfer agent (or telomer), as well as any combination thereof. A high pressure process can be carried out in tubular reactors, having one or more reaction zones, or in a combination of autoclave and tubular reactors, each comprising one or more reaction zones. A chain transfer agent can be used to control molecular weight. In a preferred embodiment, one or more chain transfer agents (CTAs) are added to an inventive polymerization process. Typical CTA's that can be used include, but are not limited to, propylene, n-butane and 1-butene. In one embodiment, the amount of CTA used in the process is from 0.03 to 10 weight percent of the total reaction mixture.

Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that only purified ethylene is required to make the ethylene-based polymer. In such cases ethylene from the recycle loop may be used. In one embodiment, the ethylene-based polymer is a LDPE.

Additives and Applications

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive polymer composition. In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). The polymers may be treated with one or more stabilizers before extrusion or other melt processes.

Blends and mixtures of the inventive polymer with other polymers may be performed. Suitable polymers for blending with the inventive polymer include natural and synthetic polymers. Exemplary polymers for blending include propylene-based polymers (both impact modifying polypropylene, isotactic polypropylene, atactic polypropylene, and random ethylene/propylene copolymers), various types of ethylene-based polymers, including high pressure, free-radical LDPE, LLDPE prepared with Ziegler-Natta catalysts, PE prepared with single site catalysts, including multiple reactor PE ("in reactor" blends of Ziegler-Natta PE and single site catalyzed PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), EVA, ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising the inventive polymer).

The polymers of this invention may be employed in a variety of conventional thermoplastic fabrication processes to produce useful articles, including, but not limited to, monolayer and multilayer films; molded articles, such as blow molded, injection molded, or rotomolded articles; coatings (for example, extrusion coatings); fibers; and woven or non-woven fabrics. An inventive polymer may be used in a variety of films, including but not limited to, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding process, or rotomolding processes. Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

DEFINITIONS

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that low amounts of impurities (for example, low amounts (e.g., ≤1.0 wt %, further ≤0.5 wt %, further ≤0.3 wt %) of CTA) can be incorporated into the polymer structure), and the term interpolymer as defined hereinafter. Impurities may be incorporated into and/or within a polymer. The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises a majority amount of polymerized ethylene monomer (based on weight of the polymer), and, optionally, may contain at least one comonomer. The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. The term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Density

Samples for density measurements were prepared according to ASTM D 4703-10 Annex A1 Procedure C. Approximately 7 g of sample was placed in a "2"×2"×135 mil thick" mold, and this was pressed at 374° F. (190° C.) for six minutes at 3,000 lb$_f$. Then the pressure was increased to 30,000 lb$_f$ for four minutes. This was followed by cooling at 15° C. per minute, at 30,000 lb$_f$, to approximately a temperature of 40° C. The "2"×2"×135 mil" polymer sample (plaque) was then removed from the mold, and three samples were cut from the plaque with a ½"×1" die cutter. Density measurements were made within one hour of sample pressing, using ASTM D792-08, Method B. Density was reported as an average of three measurements.

Melt Index

Melt index (MI), or I2, was measured in accordance with ASTM D 1238-10, Condition 190° C./2.16 kg, Procedure B, and was reported in grams eluted per 10 minutes (g/10 min).

Hexane Extractables

Polymer pellets (from the polymerization pelletization process, without further modification; approximately 2.2 grams per one "1-inch by 1-inch" square film) were pressed in a Carver Press at a thickness of 3.0-4.0 mils. The pellets were pressed at 190° C. for 3 minutes, at 40,000 lb$_f$. Non-residue gloves (PIP* CleanTeam* CottonLisle Inspection Gloves, Part Number: 97-501) were worn to prevent contamination of the film with residual oils from the hands of the operator. Each film was trimmed to a "1-inch by 1-inch" square, and weighed (2.5±0.05 g). The films were extracted for two hours, in a hexane vessel, containing about 1000 ml of hexane, at 49.5±0.5° C., in a heated water bath. The hexane was an isomeric "hexanes" mixture (for example, Hexanes (Optima), Fisher Chemical, high purity mobile phase for HPLC and/or extraction solvent for GC applications). After two hours, the films were removed, rinsed in clean hexane, and dried in a vacuum oven (80±5° C.) at full vacuum (ISOTEMP Vacuum Oven, Model 281A, at approximately 30 inches Hg) for two hours. The films were then placed in a desiccator, and allowed to cool to room temperature for a minimum of one hour. The films were then reweighed, and the amount of mass loss due to extraction in hexane was calculated. This method is based on 21 CRF 177.1520 (d)(3)(ii), with one deviation from FDA protocol by using hexanes instead of n-hexane. The average of three measurements were reported.

Nuclear Magnetic Resonance ($^{13}$C NMR)

Each sample was prepared by adding approximately "3 g of a 50/50 mixture of tetrachloroethane-d2/orthodichlorobenzene, containing 0.025 M Cr(AcAc)$_3$," to a "0.25 to 0.40 g polymer sample," in a 10 mm NMR tube. The sample was then dissolved and homogenized by heating the tube, and its contents to 150° C., using a heating block and heat gun. Each dissolved sample was visually inspected to ensure homogeneity. All data were collected using a Bruker 400 MHz spectrometer, equipped with a Bruker Dual DUL high-temperature CryoProbe. The data was acquired using a six second pulse repetition delay, 90-degree flip angles, and inverse gated decoupling, with a sample temperature of 120° C. All measurements were made on non-spinning samples in locked mode. The $^{13}$C NMR chemical shifts were internally referenced to the EEE triad at 30.0 ppm. The C6+ value was a direct measure of C6+ branches in LDPE, where the long branches were not distinguished from chain ends. The 32.2 ppm peak, representing the third carbon from the end of all chains or branches of six or more carbons, was used to determine the C6+ value. Other peaks of interest are listed in Table A.

TABLE A

| Branch Type | Peak(s) integrated | Identity of the integrated carbon peak(s) |
| --- | --- | --- |
| 1,3 diethyl | About 10.5 to 11.5 ppm | 1,3 diethyl branch methyls |
| C1 | About 19.75 to 20.50 ppm | C1, methyls |
| C2 on Quat Carbon | About 7.7 to 8.6 ppm | 2 ethyl groups on a quaternary carbon |
| C4 | About 23.3 to 23.5 ppm | Second $CH_2$ in a 4-carbon branch, counting the methyl as the first C |
| C5 | About 32.60 to 32.80 ppm | Third $CH_2$ in a 5-carbon branch, counting the methyl as the first C |

Nuclear Magnetic Resonance ($^1$H NMR)

Each sample was prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The sample was purged by bubbling N$_2$ through the solvent, via a pipette inserted into the tube, for approximately five minutes, to prevent oxidation. The tube was capped, sealed with TEFLON tape, and then soaked at room temperature, overnight, to facilitate sample dissolution. The sample was heated and vortexed at 115° C. to ensure homogeneity. The $^1$H NMR was performed on a Bruker AVANCE 400 MHz spectrometer, equipped with a Bruker Dual DUL high-temperature CryoProbe, and at a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 16 scans, AQ 1.64 s, D1 14 s. The double presaturation experiment was run with a modified pulse sequence, 100 scans, AQ 1.64 s, presaturation delay 1 s, relaxation delay 13 s.

The signal from residual $^1$H in TCE-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene (cis and trans) at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the peak or maximum plateau force (cN). The following conditions were used in the melt strength measurements: plunger speed=0.265 mm/second; wheel acceleration=2.4 mm/s$^2$; capillary diameter=2.0 mm; capillary length=30 mm; and barrel diameter=12 mm. The peak melt strength is the maximum melt strength recorded.

Dynamic Mechanical Spectroscopy (DMS)

Resins were compression-molded into "3 mm thick×1 inch" circular plaques at 350° F., for 6.5 minutes, under 20,000 lb$_f$, in air. The sample was then taken out of the press, and placed on the counter to cool. A constant temperature frequency sweep was performed, using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate was removed), and then the test was started. The method had an additional five minute delay built in, to allow for temperature equilibrium. The experiments were performed at 190° C., over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were measured.

Triple Detector Gel Permeation Chromatography (TDGPC)

The chromatographic system consisted of a PolymerChar GPC-IR (Valencia, Spain) high temperature GPC chromatograph, equipped with an internal IR5 infra-red detector (IR5) coupled to a Precision Detectors (Now Agilent Technologies) 2-angle laser light scattering (LS) detector Model 2040, and followed by a PolymerChar 4-capillary viscosity detector (three detectors in series). For all light scattering measurements, the 15 degree angle was used for measurement purposes. The autosampler oven compartment was set at 160° Celsius, and the column compartment was set at 150° Celsius. The columns used were four, Agilent "Mixed A" columns, each 30 cm, and each packed with 20-micron linear mixed-bed particles. The chromatographic solvent used was 1,2,4-trichlorobenzene, which contained 200 ppm of butylated hydroxytoluene (BHT). The solvent source was nitrogen sparged. The injection volume was 200 microliters, and the flow rate was 1.0 milliliters/minute.

Calibration of the GPC column set was performed with 21 narrow molecular weight distribution, polystyrene standards with molecular weights ranging from 580 to 8,400,000 g/mol. These standards were arranged in 6 "cocktail" mixtures, with at least a decade of separation between individual molecular weights. The standards were purchased from Agilent Technologies. The polystyrene standards were prepared at "0.025 grams in 50 milliliters of solvent" for molecular weights equal to, or greater than, 1,000,000 g/mol, and at "0.05 grams in 50 milliliters of solvent" for molecular weights less than 1,000,000 g/mol. The polystyrene standards were dissolved at 80 degrees Celsius, with gentle agitation, for 30 minutes. The polystyrene standard peak molecular weights (IR 5 detector) were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQN 1)},$$

where M is the molecular weight, A has a value of 0.4315, and B is equal to 1.0. A fifth order polynomial was used to fit the respective polyethylene-equivalent calibration points. A small adjustment to A (from approximately 0.415 to 0.44) was made to correct for column resolution and band-broadening effects, such that NIST standard NBS 1475 was obtained at 52,000 g/mol (Mw). The total plate count of the GPC column set was performed with Eicosane (prepared at 0.04 g in 50 milliliters of "TCB stabilized solvent," and dissolved for 20 minutes with gentle agitation.) The plate count (Equation 2) and symmetry (Equation 3) were measured on a 200 microliter injection according to the following equations:

$$\text{Plate count} = 5.54 * \left( \frac{(RV_{PeakMax})}{\text{Peak Width at } \frac{1}{2} \text{ height}} \right)^2, \quad \text{(EQN 2)}$$

where RV is the retention volume in milliliters, the peak width is in milliliters, the peak max is the maximum height of the peak, and ½ height is the ½ height of the peak maximum:

$$\text{Symmetry} = \frac{(\text{Rear Peak } RV_{\text{one tenth height}} - RV_{\text{Peak max}})}{(RV_{\text{Peak max}} - \text{Front Peak } RV_{\text{one tenth height}})}, \quad \text{(EQN 3)}$$

where RV is the retention volume in milliliters, and the peak width is in milliliters, "Peak max" is the maximum IR signal height corresponding to an "RV position" on the chromatogram, "One tenth height" 1/10 height of the peak maximum, where "Rear peak" refers to the peak tail at a signal retention volume (at 1/10 height of peak maximum), later than the peak max, and where "Front peak" refers to the peak front at a signal retention volume (at 1/10 height of peak maximum), earlier than the peak max. The plate count for the chromatographic system should be greater than 24,000, and the symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. Decane (a flow rate marker) was added to each sample (about 5 microliters). The samples were dissolved for two hours at 160° Celsius, under a "low speed" shaking.

IR 5 Chromatogram

The calculations of Mn(conv), Mw(conv), and Mz(conv) were based on the GPC results, using the internal IR5 detector (measurement channel) of the PolymerChar GPC-IR chromatograph, according to Equations 4-6, using PolymerChar GPCOne™ software (version 2013G), the baseline-subtracted IR chromatogram at each equally-spaced data collection point (i), and the polyethylene equivalent molecular weight obtained from the narrow standard calibration curve for the point (i) from Equation 1. Table 4 lists the conventional GPC results for the examples and comparative examples using Equations 4-6, below for the conventional GPC.

$$Mn_{(conv)} = \frac{\sum_i IR_i}{\sum_i (IR_i / M_{polyethylene_i})}, \quad \text{(EQN 4)}$$

$$Mw_{(conv)} = \frac{\sum_i (IR_i * M_{polyethylene_i})}{\sum_i IR_i}, \quad \text{(EQN 5)}$$

$$Mz_{(conv)} = \frac{\sum_i (IR_i * M_{polyethylene_i}^2)}{\sum_i (IR_i * M_{polyethylene_i})}. \quad \text{(EQN 6)}$$

In order to monitor the deviations over time, a flowrate marker (decane) was introduced into each sample via a micropump controlled with the PolymerChar GPC-IR system. This flowrate marker (FM, here decane) was used to linearly correct the pump flowrate (Flowrate(nominal)) for each sample, by aligning the RV value of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate(effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system based on a flow marker peak, the effective flowrate (with respect to the narrow standards calibration) was calculated using Equation 7. Processing of the flow marker peak was done via the PolymerChar GPCOne™ Software. Acceptable flowrate correction was such that the effective flowrate should be within +/−2% of the nominal flowrate.

$$\text{Flowrate(effective)} = \text{Flowrate(nominal)} * (RV(\text{FM Calibrated})/RV(\text{FM Sample})) \quad \text{(EQN 7)}$$

The Systematic Approach for the determination of multi-detector offsets was done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)). Alignment of the triple detector log (MW and IV) results (generated from a broad homopolymer polyethylene standard (Mw/Mn=3)), to the narrow standard column calibration results (generated from the narrow standards calibration curve), was done using the PolymerChar GPCOne™ Software.

Light Scattering Chromatogram

The absolute molecular weight data (MWabs) was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)), using the PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight (traceable to NBS 1475 homopolymer polyethylene reference sample). The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol. Table 5 lists the light scattering GPC results for the examples and comparative examples.

The Equation for Mw(abs) is an area-based result, using the baseline-subtracted 15 degree light scattering signal and the baseline-subtracted IR5 measurement sensor signal (applying the mass and light scattering constants), as determined from GPCOne™ software, $$Mw_{(abs)} = \frac{\sum_i LS_i}{\sum_i IR_i} \times \text{Mass Constant} / LS \text{ constant.}$$

The equation for Mz(abs) relied on a point-by point determination of the absolute molecular weight derived from the ratio of the baseline-subtracted, 15 degree light scattering signal and the baseline-subtracted, IR5 measurement sensor signal, and factored for the mass constant and light scattering constant, using GPCOne™ software. A straight-line fit was used to extrapolate the absolute molecular weight, where either detector (IR5 or LS) is below approximately 4% relative peak signal height (maximum peak height).

$$M_{z(abs)} = \frac{\sum_{i}^{i}(IR_i * M_{Abs_i}^2)}{\sum_{i}(IR_i * M_{Abs_i})}.$$

Viscosity Chromatogram

The absolute intrinsic viscosity data (IV(abs)) was obtained using the area of the specific viscosity chromatogram, obtained from the PolymerChar viscometer detector, when calibrated to the known intrinsic viscosity of NBS 1475. The overall injected concentration, used in the determination of the intrinsic viscosity, was obtained from the mass detector area and the mass detector constant, derived from a suitable linear polyethylene homopolymer, or one of the polyethylene standards of known intrinsic viscosity (traceable to NBS 1475 homopolymer polyethylene reference sample). The equation for IV(abs) is an area-based result using the baseline-subtracted specific-viscosity signal (DV) and the baseline-subtracted IR5 measurement sensor signal (applying the mass and viscosity constants), as determined from GPCOne™ software:

$$IV_{(Abs)} = \frac{\sum_{i}^{i} DV_i}{\sum_{i} IR_i} \times (\text{Mass Constant}/\text{Viscosity constant}).$$

CDF Calculation Method for each Chromatogram

Figure 2:
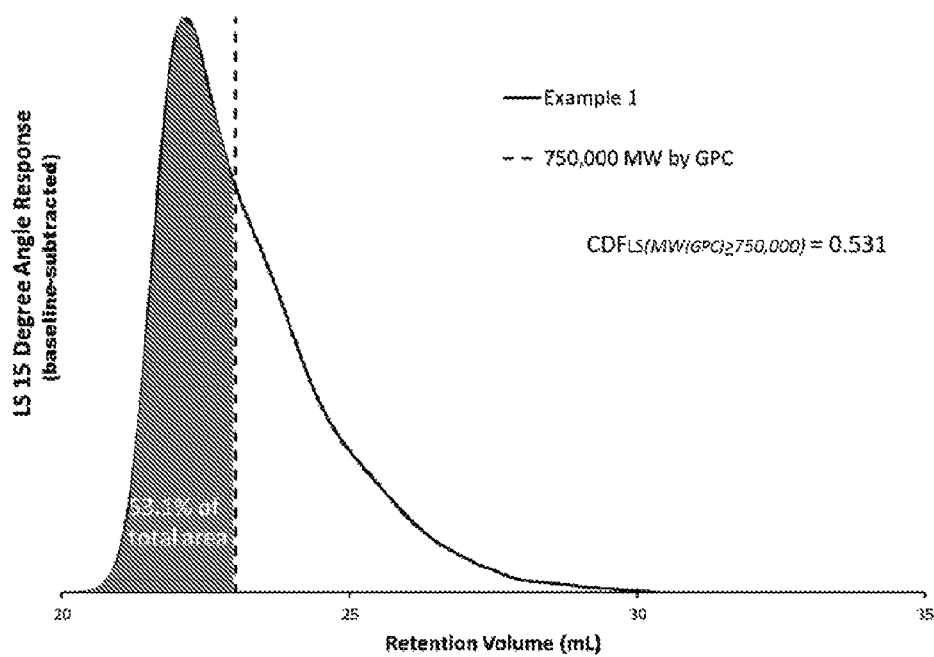
FIG. 2 depicts a chromatogram for the $CDF_{LS}$ determination of Example 1.
Figure 3:
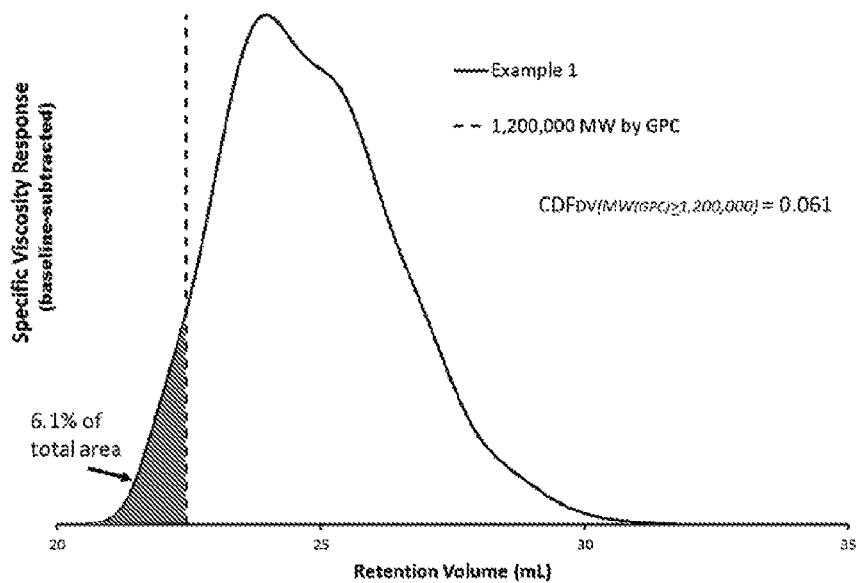
FIG. 3 depicts a chromatogram for the $CDF_{DV}$ determination of Example 1.

The calculation of the following; a) cumulative detector fractions (CDF) from the IR5 measurement detector ("CDF$_{IR}$"), b) cumulative detector fractions from the low angle laser light scattering detector ("CDF$_{LS}$"), and c) cumulative detector fractions from the viscosity detector ("CDF$_{DV}$"), were each determined by the following steps (respectively, visually represented as FIG. 1, FIG. 2, and FIG. 3 for CDF$_{IR}$ (IR 5 detector), CDF$_{LS}$ (LS detector), and CDF$_{DV}$ (viscosity detector). 1) Linearly flow correct the chromatogram based on the relative retention volume ratio of the decane peak between the sample and that of a consistent narrow standards cocktail mixture. 2) Correct the light scattering detector offset relative to the IR 5 detector, as previously described. See above "Mourey and Balke" references. 3) Correct the viscosity detector offset relative to the IR 5 detector, as previously described. See above "Mourey and Balke" references. 4) Calculate the molecular weights at each "retention volume (RV) data slice" based on the polystyrene calibration curve, modified by the polystyrene to polyethylene conversion factor of approximately (0.43) as described previously, with a one point (slice) per second, and with a pump running at 1 ml/min. 5) Subtract baselines from each of the viscosity, light scattering, and infra-red chromatograms, and the integration window for each was set, making certain to integrate all of the low molecular weight retention volume range, where the low molecular weight retention volume range is observable (GPC profile greater than the baseline) from the infra-red chromatogram (thus setting the highest RV limit to the same index in each chromatogram). Material in the integration, which corresponds to a molecular weight less than 150 g/mole, is not included in any of the chromatograms. 6) Calculate the respective cumulative detector fraction (CDF) of the IR5 chromatogram (CDF$_{IR}$), LALLS chromatogram (CDF$_{LS}$), and viscosity chromatogram (CDF$_{DV}$), based on the baseline-subtracted peak height (H), from the high to low molecular weight (low to high retention volume), at each data slice (j), according to Eqns 8A, 8B, or 8C, respectively:

$$CDF_{IR} = \frac{\sum_{j=RV\ at\ 10,000\ GPC\ MW}^{j=RV\ at\ Highest\ Integration\ Volume} H_j}{\sum_{j=RV\ at\ Lowest\ Integration\ Volume}^{j=RV\ at\ Highest\ Integration\ Volume} H_j}, \quad (\text{EQN 8A})$$

$$CDF_{LS} = \frac{\sum_{j=RV\ at\ Lowest\ Integration\ Volume}^{j=RV\ at\ 750,000\ GPC\ MW} H_j}{\sum_{j=RV\ of\ Lowest\ Integration\ Volume}^{j=RV\ at\ Highest\ Integration\ Volume} H_j}, \quad (\text{EQN 8B})$$

$$CDF_{DV} = \frac{\sum_{j=RV\ at\ Lowest\ Integration\ Volume}^{j=RV\ at\ 1,200,000\ GPC\ MW} H_j}{\sum_{j=RV\ at\ Lowest\ Integration\ Volume}^{j=RV\ at\ Highest\ Integration\ Volume} H_j}. \quad (\text{EQN 8C})$$

FIG. 1 depicts an example determination of the CDF$_{IR}$ for Example 1: the fractional area of the IR5 measurement sensor channel of the detector (chromatogram) less than, or equal to, 10,000 g/mol MW, by GPC after baseline subtraction. FIG. 2 depicts an example determination of the CDF$_{LS}$ for Example 1: the fractional area of the 15 degree light scattering signal greater than, or equal to, 750,000 g/mol MW, by GPC after baseline subtraction. FIG. 3 depicts an example determination of CDF$_{DV}$ for Example 1: the fractional area of the specific viscosity signal greater than, or equal to, 1,200,000 g/mol MW, by GPC after baseline subtraction.

gpcBR Branching Index by Triple Detector GPC (TDGPC)

The gpcBR branching index was determined by first calibrating the light scattering, viscosity, and concentration detectors as described previously. Baselines were then subtracted from the light scattering, viscometer, and concentration chromatograms. Integration windows were then set, to ensure integration of all of the low molecular weight retention volume range in the light scattering and viscometer chromatograms that indicate the presence of detectable polymer from the refractive index chromatogram. Linear polyethylene standards were then used to establish polyethylene and polystyrene Mark-Houwink constants. Upon obtaining the constants, the two values were used to construct two linear reference conventional calibrations for polyethylene molecular weight and polyethylene intrinsic viscosity as a function of elution volume, as shown in Equations (9) and (10):

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad (\text{EQN 9})$$

$$[\eta]_{PE} = K_{PS} \cdot M_{PS}^{\alpha+1} / M_{PE}. \quad (\text{EQN 10})$$

The gpcBR branching index is a robust method for the characterization of long chain branching as described in Yau, Wallace W., "Examples of Using 3D-GPC-TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From TDGPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With TDGPC, sample intrinsic viscosities were also obtained independently using Equations (11). The area calculation in this case offers more precision, because, as an overall sample area, it is much less sensitive to variation caused by detector noise and 3D-GPC settings on baseline and integration limits. More importantly, the peak area calculation was not affected by the detector volume offsets. Similarly, the high-precision, sample intrinsic viscosity (IV) was obtained by the area method shown in Equation (11):

$$IV = [\eta] = \sum_i w_i IV_i = \sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{\text{Conc. Area}},$$ (EQN 11)

where $DP_i$ stands for the differential pressure signal monitored directly from the online viscometer.

To determine the gpcBR branching index, the light scattering elution area for the sample polymer was used to determine the molecular weight of the sample. The viscosity detector elution area for the sample polymer was used to determine the intrinsic viscosity (IV or [η]) of the sample. Initially, the molecular weight and intrinsic viscosity for a linear polyethylene standard sample, such as SRM1475a or an equivalent, were determined using the conventional calibrations ("cc") for both molecular weight and intrinsic viscosity as a function of elution volume:

$$[\eta]_{cc} = \sum_i \left(\frac{C_i}{\sum_i C_i}\right) IV_i = \sum_i w_i IV_{cc,i}.$$ (EQN 12)

Equation (13) was used to determine the gpcBR branching index:

$$gpcBR = \left[\left(\frac{[\eta]_{cc}}{[\eta]}\right) \cdot \left(\frac{M_w}{M_{w,cc}}\right)^{\alpha_{PE}} - 1\right],$$ (EQN 13)

wherein [η] is the measured intrinsic viscosity, $[\eta]_{cc}$ is the intrinsic viscosity from the conventional calibration (or conv GPC), Mw is the measured weight average molecular weight, and $M_{w,cc}$ is the weight average molecular weight of the conventional calibration. The weight average molecular weight by light scattering (LS) is commonly referred to as "absolute weight average molecular weight" or "Mw(abs)." The $M_{w,cc}$ from using conventional GPC molecular weight calibration curve ("conventional calibration") is often referred to as "polymer chain backbone molecular weight," "conventional weight average molecular weight" and "Mw (conv)."

All statistical values with the "cc or conv" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.355, respectively, for polyethylene, and 0.722 and −3.993, respectively, for polystyrene. Once the K and a values have been determined using the procedure discussed previously, the procedure was repeated using the branched samples. The branched samples were analyzed using the final Mark-Houwink constants as the best "cc" calibration values. The interpretation of gpcBR is straight forward. For linear polymers, gpcBR will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$ and the calculated IV, will be higher than the measured polymer IV. In fact, the gpcBR value represents the fractional IV change due to the molecular size contraction effect as a result of polymer branching. A gpcBR value of 0.5 or 2.0 would mean a molecular size contraction effect of IV at the level of 50% and 200%, respectively, versus a linear polymer molecule of equivalent weight. For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low TDGPC detector response at high molecular weight from the concentration detector. Errors in detector volume alignment also do not affect the precision of the gpcBR index determination.

Calculation of LCB Frequency

The $LCB_f$ was calculated for each polymer sample by the following procedure:

1) The light scattering, viscosity, and concentration detectors were calibrated with NBS 1475 homopolymer polyethylene (or equivalent reference). 2) The light scattering and viscometer detector offsets were corrected relative to the concentration detector as described above in the calibration section (see references to Mourey and Balke). 3) Baselines were subtracted from the light scattering, viscometer, and concentration chromatograms and set integration windows making certain to integrate all of the low molecular weight retention volume range in the light scattering chromatogram that is observable from the refractometer chromatogram. 4) A linear homopolymer polyethylene Mark-Houwink reference line was established by injecting a standard with a polydispersity of at least 3.0, calculate the data file (from above calibration method), and record the intrinsic viscosity and molecular weight from the mass constant corrected data for each chromatographic slice. 5) The LDPE sample of interest was analyzed, the data file (from above calibration method) was calculated, and the intrinsic viscosity and molecular weight from the mass constant, corrected data for each chromatographic slice, were recorded. At lower molecular weights, the intrinsic viscosity and the molecular weight data may need to be extrapolated such that the measured molecular weight and intrinsic viscosity asymptotically approach a linear homopolymer GPC calibration curve. 6) The homopolymer linear reference intrinsic viscosity was shifted at each point (i) by the following factor: IVi=IVi*0.964 where IV is the intrinsic viscosity. 7) The homopolymer linear reference molecular weight was shifted by the following factor: M=M*1.037 where M is the molecular weight. 8) The g' at each chromatographic slice was calculated according to the following equation: $g'=(IV(LDPE)/IV(\text{linear reference}))$, at the same M. The IV(linear reference) was calculated from a fifth-order polynomial fit of the reference Mark-Houwink Plot and where IV(linear reference) is the intrinsic viscosity of the linear homopolymer polyethylene reference (adding an amount of SCB (short chain branching) to account for backbiting through 6) and 7) at the same molecular weight (M)). The IV ratio is assumed to be one at molecular weights less than 3,500 g/mol to account for natural scatter in the light scattering data. 9) The number of branches at each data slice was calculated according to the following equation:

$$\left[\frac{IV_{LDPE}}{IV_{linear\_reference}}\right]_M^{1.33} = \left[\left(1+\frac{B_n}{7}\right)^{1/2}+\frac{4}{9}\frac{B_n}{\pi}\right]^{-1/2}.$$

10) The average LCB quantity was calculated across all of the slices (i), according to the following equation:

$$LCB_{1000C} = \frac{\sum_{M=3500}^{i}\left(\frac{B_{n_i}}{14000}c_i\right)}{\sum c_i}.$$

Differential Scanning Calorimetry (DSC)

Differential Scanning Calorimetry (DSC) can be used to measure the melting and crystallization behavior of a polymer over a wide range of temperatures. For example, the TA Instruments Q2000 DSC, equipped with an RCS (refrigerated cooling system) and an autosampler is used to perform this analysis. During testing, a nitrogen purge gas flow of 50 ml/min is used. Each sample is melt pressed into a thin film at about 190° C.; the melted sample is then air-cooled to room temperature (~25° C.). The film sample was formed by pressing a "0.5 to 0.9 gram" sample at 190° C. at 20,000 lb$_f$ and 10 seconds, to form a "0.1 to 0.2 mil thick" film. A 3-10 mg, six mm diameter specimen was extracted from the cooled polymer, weighed, placed in an aluminum pan (about 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves are recorded. The cooling curve was analyzed by setting baseline endpoints from the beginning of crystallization to −20° C. The heating curve was analyzed by setting baseline endpoints from −20° C. to the end of melting. The values determined were peak melting temperature (Tm), peak crystallization temperature (Tc), heat of fusion (Hf) (in Joules per gram), and the calculated % crystallinity for ethylene-based polymer samples using the following equations: % Crystallinity=((Hf)/(292 J/g))×100 (EQN 14). The heat of fusion and the peak melting temperature are reported from the second heat curve. The peak crystallization temperature is determined from the cooling curve.

Film Testing

The following physical properties were measured on the films as described in the experimental section. Prior to testing, the film was conditioned for at least 40 hours (after film production) at 23° C. (+/−2° C.) and 50% relative humidity (+/−5% R.H). See Tables 12-14 for the thickness of each film.

Total (Overall) Haze and Internal Haze: Internal haze and total haze were measured according to ASTM D 1003-07. Internal haze was obtained via refractive index matching using mineral oil (1-2 teaspoons), which was applied as a coating on each surface of the film. A Hazegard Plus (BYK-Gardner USA; Columbia, Md.) was used for testing. For each test, 5 samples were examined, and an average reported. Sample dimensions were "6 in×6 in".

45° Gloss: ASTM D2457-08 (average of five film samples; each sample "10 in×10 in"). Clarity: ASTM D1746-09 (average of five film samples; each sample "10 in×10 in"). 2% Secant Modulus—MD (machine direction) and CD (cross direction): ASTM D882-10 (average of five film samples in each direction). 1 inch wide test strips are loaded in a tensile testing frame using line contact grips at a contact point (gauge length) separation of 4 inches. Samples are tested at a crosshead speed of 2 inches/min up to a nominal stain of 5%.

MD and CD Elmendorf Tear Strength: ASTM D1922-09. The force in grams required to propagate tearing across a film or sheeting specimen is measured using a precisely calibrated pendulum device. Acting by gravity, the pendulum swings through an arc, tearing the specimen from a precut slit. The specimen is held on one side by the pendulum and on the other side by a stationary member. The loss in energy by the pendulum is indicated by a pointer or by an electronic scale. The scale indication is a function of the force required to tear the specimen. The sample used is the 'constant radius geometry' as specified in D1922. Testing would be typically carried out on samples that have been cut from both the MD and CD directions. Prior to testing, the sample thickness is measured at the sample center. A total of 15 specimens per direction are tested, and the average tear strength is reported. Samples that tear at an angle greater than 60° from the vertical are described as 'oblique' tears—such tears should be noted, though the strength values are included in the average strength calculation.

MD and CD Tensile Strength: ASTM D882-10 (average of five film samples in each direction). The samples are loaded onto a tensile testing frame using line grip jaws (flat rubber on one side of the jaw and a line grip on the other side of the jaw) set at a gauge length (line grip to line grip distance) of 2 inches. The samples are then strained at a crosshead speed of 20 inches/min. From the resulting load-displacement curve the yield strength and yield strain, tensile strength and tensile strength at break, strain at break and energy to break can be determined.

Dart: ASTM D1709-09. The test result is reported by Method A, which uses a 1.5" diameter dart head and 26" drop height. The sample thickness is measured at the sample center, and the sample is then clamped by an annular specimen holder with an inside diameter of 5 inches. The dart is loaded above the center of the sample and released by either a pneumatic or electromagnetic mechanism. Testing is carried out according to the 'staircase' method. If the sample fails, a new sample is tested with the weight of the dart reduced by a known and fixed amount. If the sample does not fail, a new sample is tested with the weight of the dart increased by a known increment. After 20 specimens have been tested the number of failures is determined. If this number is 10 then the test is complete. If the number is less than 10, the testing continues until 10 failures have been recorded. If the number is greater than 10, testing is continued until the total number of non-failures is 10. The dart (strength) is determined from these data as per ASTM D1709.

Puncture Strength: Puncture was measured on an INSTRON Model 4201 with SINTECH TESTWORKS SOFTWARE Version 3.10. The specimen size was "6 in×6 in," and five measurements were made to determine an average puncture value. A "100 lb load cell" was used with a round specimen holder of 4 inch diameter. The puncture probe was a ½ inch diameter, polished, stainless steel ball on a 0.25 inch diameter support rod with a 7.5 inch maximum travel length. There was no gauge length, and prior to the start of the test, the probe was as close as possible to, but not touching, the specimen. The puncture probe was pushed into the centre of the clamped film at a cross head speed of 10 inches/minute. A single thickness measurement was made in the centre of the specimen. For each specimen, the puncture (ft-lb$_f$ per in$^3$) was determined. The puncture probe was cleaned using a "KIM-WIPE" after each specimen.

"Shrink Force Measurement of Low Shrink Force Films", SPE ANTEC Proceedings, p. 1264 (2008). The shrink tension of film samples was measured through a temperature ramp test that was conducted on an RSA-III Dynamic Mechanical Analyzer (TA Instruments; New Castle, Del.) with a film fixture. Film specimens of "12.7 mm wide" and "63.5 mm long" were die cut from the film sample, either in the machine direction (MD) or the cross direction (CD), for testing. The film thickness was measured by a Mitutoyo Absolute digimatic indicator (Model C112CEXB). This indicator had a maximum measurement range of 12.7 mm, with a resolution of 0.001 mm. The average of three thickness measurements, at different locations on each film specimen, and the width of the specimen, were used to calculate the film's cross sectional area (A), in which "A=Width×Thickness" of the film specimen that was used in shrink film testing.

A standard film tension fixture from TA Instruments was used for the measurement. The oven of the RSA-III was equilibrated at 25° C., for at least 30 minutes, prior to zeroing the gap and the axial force. The initial gap was set to 20 mm. The film specimen was then attached onto both the upper and the lower fixtures. Typically, measurements for MD only require one ply film. Because the shrink tension in the CD direction is typically low, two or four plies of films are stacked together for each measurement to improve the signal-to-noise ratio. In such a case, the film thickness is the sum of all of the plies. In this work, a single ply was used in the MD direction and two plies were used in the CD direction. After the film reached the initial temperature of 25° C., the upper fixture was manually raised or lowered slightly to obtain an axial force of −1.0 g. This was to ensure that no buckling or excessive stretching of the film occurred at the beginning of the test. Then the test was started. A constant fixture gap was maintained during the entire measurement. The temperature ramp started at a rate of 90° C./min, from 25° C. to 80° C., followed by a rate of 20° C./min, from 80° C. to 160° C. During the ramp from 80° C. to 160° C., as the film shrunk, the shrink force, measured by the force transducer, was recorded as a function of temperature for further analysis. The difference between the "peak force" and the "baseline value before the onset of the shrink force peak" is considered the shrink force (F) of the film. The shrink tension of the film is the ratio of the shrink force (F) to the initial cross sectional area (A) of the film.

EXPERIMENTAL

Preparation of Inventive Ethylene-Based Polymers

Figure 4:
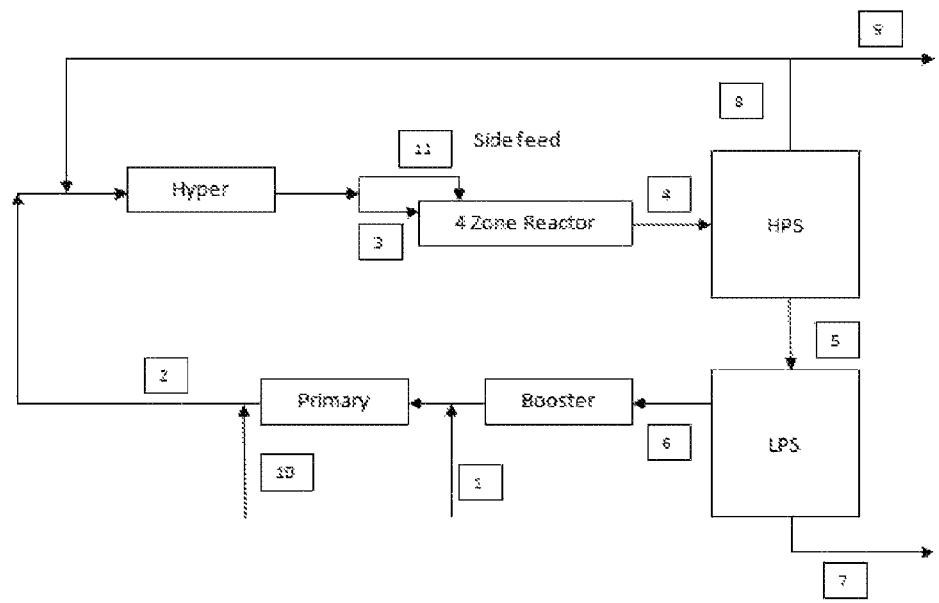
FIG. 4 depicts a block diagram of the polymerization system used to produce the ethylene-based polymers (LDPE) of Examples 1-4.

FIG. 4 is a block diagram of the process reaction system used to produce the inventive ethylene-based polymers (LDPEs). The process reaction system in FIG. 4 is a partially closed-loop, dual recycle, high-pressure, low density polyethylene production system. The process reaction system is comprised of a fresh ethylene feed line [1], a booster and primary compressor ("Primary"), a hypercompressor ("Hyper") and a four zone tubular reactor ("4 Zone reactor"). Stream [3] is heated by a "Pre-heater" to a sufficiently high temperature, and fed to the front of the reactor. Stream [11] is fed as a side stream to the reactor. In the reactor, polymerization is initiated with the help of four mixtures, each containing one or more free radical initiation systems (see Table 1), which are injected at the inlet of each reaction zone (not shown). The maximum temperature in each reaction zone is controlled at a set point, by regulating the feed amount of the mixture of initiators at the start of each reaction zone. Each reaction zone has one inlet and one outlet. Each inlet stream consists of the outlet stream from the previous zone and/or added ethylene-rich feed stream. Upon completing the polymerization, the reaction mixture is depressurized and cooled in stream [4]. The process further consists of a high pressure separator "HPS," which separates the reaction mixture into an ethylene rich stream [8], which is cooled and recycled back to the suction of the hyper, and a polymer rich stream [5], which is sent to the low pressure separator "LPS" for further separation. In the LPS, the ethylene rich stream is cooled, and recycled back to the booster ("Booster") in stream [6]. From the booster, the ethylene is compressed further by the primary compressor. Feed [2] is then recycled to the suction of the hypercompressor. The polymer leaving the LPS [7] is further pelletized and purged. The chain transfer agent "CTA" feed [10] is injected into the ethylene stream at the discharge of the primary compressor. Stream [9] is a purge stream used to remove impurities and/or inerts. Cooling jackets (using high pressure water) are mounted around the outer shell of the tube reactor and pre-heater.

For Inventive Examples 1-4, a mixture containing t-butyl peroxy-2 ethylhexanoate (TBPO), tert-butyl peroxyacetate (TBPA), and an iso-paraffinic hydrocarbon solvent (boiling range 171-191° C.; for example, ISOPAR H) was used as the initiator mixture for the first reaction zone. For the second reaction zone, a mixture containing di-tert-butyl peroxide (DTBP), TBPO, TBPA, and the iso-paraffinic hydrocarbon solvent was used. For the third and fourth reaction zones, a mixture of TBPA, DTBP, and iso-paraffinic hydrocarbon solvent was used. This data is summarized in Table 1. Propylene was used as the CTA. The concentration of the CTA fed to the process was adjusted to control the melt index of the product.

It was discovered that these polymerization conditions produced a "LDPE fractional melt index resin" with a broad molecular weight distribution (MWD). Table 2 shows that the polymerization conditions used to form the inventive samples were relatively low reactor pressures and high reactor peak temperatures, in order to optimize the molecular weight distribution of the polymer in the tubular reactor. The molecular weight of each polymer was also optimized by reducing the CTA (propylene) concentration fed to the reactor.

Figure 5:
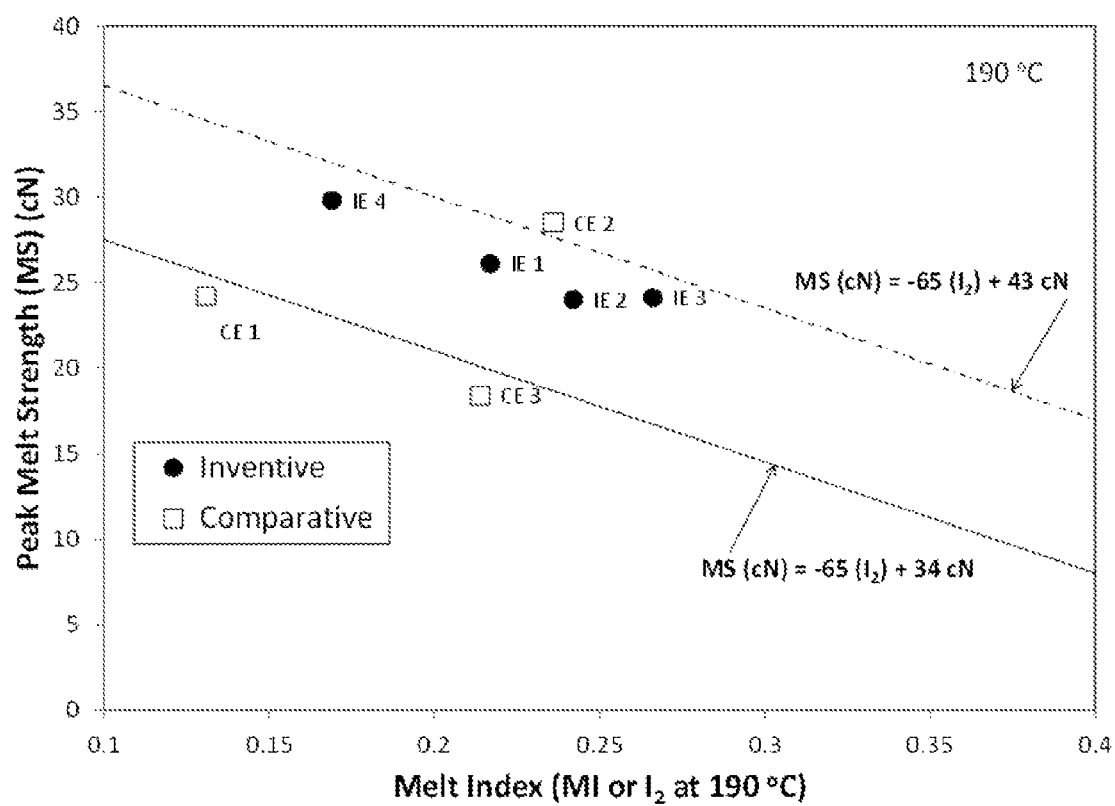
FIG. 5 depicts the "peak melt strength as a function of melt index" for the inventive examples and comparative examples.

Properties of Inventive Examples and Comparative Examples are listed in Tables 3-10. Table 3 contains the melt index (I2 or MI), density, % hexane extractables, and peak melt strength data. The Inventive Examples exhibit a good and relatively high melt strength, and provide a good balance of bubble stability, in combination with high output on blown film lines, and good mechanical properties. FIG. 5 is a plot of the peak melt strength versus the melt index for the samples of Table 3, and shows that these inventive polymers (IE1 through IE4) have a peak melt strength, at 190° C., greater than "-65*($I_2$ at 190° C.)+34 cN", and less than "-65*($I_2$ at 190° C.)+43 cN". The melt index, shown in Table 3, is higher for the Inventive Examples than for CE1, yet the melt strength of the Inventive Examples are similar to, or higher than, that of CE1, the lowest melt index comparative polymer. This is attributed to the molecular design of the inventive polymers (LDPEs), which is discussed further. Tables 4 through Table 6 contain the TDGPC data, illustrating for the inventive polymers the relatively broad MWD(conv), the broad Mw(conv)/Mn(conv) ratio, and the relatively high z-average molecular weight, Mz(conv) and high weight average molecular weight, Mw(conv), all of which contribute to the higher melt strength and good output on blown film lines, as seen with these inventive polymers. The Mn(conv) is relatively low for the inventive polymers as compared to the comparative polymers.

Table 5 contains the TDGPC-related properties derived from the LS and viscosity detectors, in conjunction with the concentration detector. As seen in Table 5, it has been discovered that the inventive polymers have higher Mw(abs), Mz(abs), and Mw(abs)/Mw(conv). These higher values correlate with relatively high melt strength and good output, as seen on blown film lines, using the inventive polymers. It has been discovered that the inventive polymers have a high amount of long branching (LCBf and/or gpcBR), at a high Mw (Mw(abs)), and substantial ultra-high MW material (Mz(abs)), all of which contribute to the desired melt strength and improved processability (for example, increased blown film output and decreased screen pressure). As mentioned, the melt strength is similar, or higher, for the Inventive Examples of higher melt index, as compared to CE1, and this is primarily due to the design of the inventive polymers as described by the TDGPC molecular weight features. The design of the inventive polymers is optimized to give an optimum melt strength, and a good balance of physical properties, along with good drawability, bubble stability, and blown film output, when forming films, with or without an additional polymer, such as a LLDPE.

Table 6 contains several unique TDGPC properties, which further reflect the differences in structure between the Inventive Examples and Comparative Examples. The $CDF_{IR}$, $CDF_{LS}$, and $CDF_{DV}$ determinations are from the fractional baseline-subtracted chromatographic areas, versus the whole chromatogram, using the limits as expressed in Equations 8A, 8B, and 8C above. The Mw(abs) is determined from the mass-normalized area of the baseline-subtracted 15 degree light scattering signal, and the IV(Abs) is determined from the mass-normalized area of the baseline-subtracted specific viscosity chromatogram. The Mw(abs) is compared (ratio taken) against the conventional weight-average molecular weight (Mw(conv)), and this ratio is an indication of the total molecular weight (including all branching) to the backbone molecular weight of the polymer. It has been discovered that ethylene-based polymers that contain higher Mw(abs)/Mw(conv) ratios, along with higher Mz(abs) values (indicating high molecular weight branched content), having discernible chromatographic high MW area (as indicated by a high $CDF_{LS}$ value), an adequate supply of high MW detectable backbone segments (as indicated by a high $CDF_{DV}$ value), while possessing enough low molecular weight material (as indicated by a high $CDF_{IR}$ value) to maintain excellent processing, are preferred to obtain a good melt strength/processability balance.

The $CDF_{LS}$ is a simple means to define high MW highly long chain branched content (no detector division, extrapolations, or advanced calculations necessary). The $CDF_{DV}$ is a simple means to describe the amount of polymer segments that are available for entanglements (such segments are discernible using the viscosity response). The $CDF_{IR}$ is a simple means to describe the enhanced processing found by increasing the low molecular weight content. The IV(abs) and Mw(abs) are each a general means to quantitate the polymer constituents giving rise to viscosity at lower shear rates.

Table 7 contains the DMS viscosity data, as summarized by the viscosities measured at 0.1, 1, 10, and 100 rad/s, the viscosity ratio, or the ratio of viscosity measured at 0.1 rad/s to the viscosity measured at 100 rad/s, all being measured at 190° C., and the tan delta measured at 0.1 rad/s and 190° C. The inventive polymers each had a relatively high "low frequency viscosity, the viscosity at 0.1 rad/s" values. A high "low frequency viscosity" may be correlated with good melt strength, good bubble stability, and high film output. Thus, these Inventive Examples still show very good melt strength and very high output on blown film lines, as compared to the comparative polymers, some of which had even higher "low frequency viscosity" values. The viscosity ratio, which reflects the change in viscosity with frequency, is, like the low frequency viscosity, relatively high for the inventive polymers, but not always as high as that for some of the comparative polymers. The high ratio values are reflective of the good processability of the Inventive Examples when making blown film. The tan delta, at 0.1 rad/s, values of the inventive polymers are relatively low, indicative of high melt elasticity, which may also be correlated with good blown film bubble stability.

Table 8 contains the branches per 1000 total carbons as measured by $^{13}$C NMR. These LDPE polymers contain amyl, or C5 branches, which are not contained in substantially linear polyethylenes, such as AFFINITY Polyolefin Plastomers, or the LLDPEs, such as DOWLEX Polyethylene Resins, both produced by The Dow Chemical Company. Each inventive and comparative LDPE, shown in Table 8, contains greater than, or equal to, 0.5 amyl groups (branches) per 1000 total carbon atoms (the Inventive Examples contain greater than 1 amyl groups (branches) per 1000 total carbon atoms). The Inventive Examples contain relatively low levels of C1 per 1000 total carbon atoms, in which C1 is attributable to the propylene used as a CTA. The Comparative Examples contain either much higher levels of C1 per 1000 total carbon atoms, or no C1 is detected. The Inventive Examples are also shown to contain the highest levels of 1,3-diethyl branches per 1000 total carbon atoms, the highest levels of C2 on the quaternary carbon per 1000 total carbon atoms, the highest levels of C4 per 1000 total carbon atoms, high levels of C5 (amyl group) per 1000 total carbon atoms, and high levels of C6+ per 1000 total carbon atoms. Table 9 contains unsaturation results by $^1$H NMR. Table 10 contains the DSC results of the melting point, $T_m$, the heat of fusion, the percent crystallinity, and the crystallization point, $T_c$.

TABLE 1

Peroxide (PO) initiator flows, in pounds per hour, at each injection point.

| Reaction Zone | Initiator | Example 1 Neat PO lbs/hour | Example 2 Neat PO lbs/hour | Example 3 Neat PO lbs/hour | Example 4 Neat PO lbs/hour |
|---|---|---|---|---|---|
| #1 | TBPO | 3.3 | 3.5 | 3.6 | 3.1 |
| #1 | TBPA | 1.4 | 1.5 | 1.5 | 1.3 |
| #2 | TBPO | 9.0 | 8.6 | 8.8 | 8.8 |
| #2 | TBPA | 2.6 | 2.5 | 2.5 | 2.5 |
| #2 | DTBP | 1.3 | 1.2 | 1.3 | 1.3 |
| #3 | TBPA | 4.6 | 4.6 | 4.6 | 5.0 |
| #3 | DTBP | 10.8 | 10.7 | 10.8 | 11.7 |
| #4 | TBPA | 2.0 | 2.0 | 1.9 | 1.9 |
| #4 | DTBP | 4.6 | 4.7 | 4.4 | 4.5 |

TABLE 2

Process conditions used to polymerize Examples (T = temperature).

| Process Variables | Ex. 1 | Ex. 2 | Ex. 3 | Ex 4 |
|---|---|---|---|---|
| Reactor Pressure (Psig) | 31,518 | 31,545 | 31,429 | 31,530 |
| Zone 1 Initiation T (° C.) | 143 | 143 | 143 | 143 |
| Zone 1 Peak T (° C.) | 277 | 277 | 277 | 275 |
| Zone 2 Initiation T (° C.) | 155 | 153 | 153 | 153 |
| Zone 2 Peak T (° C.) | 303 | 303 | 303 | 303 |
| Zone 3 Initiation T (° C.) | 264 | 260 | 259 | 267 |
| Zone 3 Peak T (° C.) | 304 | 302 | 301 | 303 |
| Zone 4 Initiation T (° C.) | 270 | 269 | 270 | 270 |
| Zone 4 Peak T (° C.) | 295 | 295 | 295 | 295 |
| Fresh ethylene Flow (lb/hr) | 25,560 | 25,450 | 25,051 | 27,570 |
| Ethylene Throughput to Reactor (lb/hr) | 101,304 | 101,360 | 101,260 | 101,173 |
| Ethylene Conversion (%) | 25.1 | 25.1 | 24.8 | 25.3 |
| Propylene Flow (lb/hr) | 36 | 36 | 36 | 36 |
| Ethylene Purge Flow (lb/hr) | 580 | 498 | 499 | 1,710 |
| Recycle Prop Conc. (% Vol) | 0.071 | 0.079 | 0.072 | 0.066 |
| Pre-heater T (° C.) | 200 | 200 | 200 | 200 |
| Reactor Cooling System 1 T (° C.) | 188 | 188 | 188 | 188 |
| Reactor Cooling System 2 T (° C.) | 185 | 185 | 185 | 185 |

TABLE 3

Melt index ($I_2$), density, % hexane extractables, and peak melt strength (MS) at 190° C. and of Examples (Ex.) and Comparative Examples (CE)

| Sample | $I_2$ (g/10 min) | Density (g/cc) | Hexane Extractables (%) | Peak Melt Strength (cN) |
|---|---|---|---|---|
| Ex. 1 | 0.22 | 0.9205 | 2.04 | 26.1 |
| Ex. 2 | 0.24 | 0.9202 | 1.96 | 23.9 |
| Ex. 3 | 0.27 | 0.9202 | 2.05 | 24.3 |
| Ex. 4 | 0.17 | 0.9194 | 2.18 | 29.9 |
| CE 1* | 0.13 | 0.9206 | 1.36 | 24.2 |
| CE 2** | 0.24 | 0.9211 | 1.54 | 28.6 |
| CE 3*** | 0.21 | 0.9205 | 1.12 | 18.3 |

*AGILITY 1000 available from the Dow Chemical Company.
**LDPE 150E available from The Dow Chemical Company.
***LDPE 132I available from the Dow Chemical Company.

TABLE 4

Conventional GPC properties of Examples (Ex.) and Comparative Examples (CE)

| Sample | Mn(conv) (g/mol) | Mw(conv) (g/mol) | Mz(conv) (g/mol) | Mw(conv)/Mn(conv) |
|---|---|---|---|---|
| Ex. 1 | 15,100 | 160,500 | 679,200 | 10.6 |
| Ex. 2 | 15,100 | 160,500 | 681,000 | 10.6 |
| Ex. 3 | 15,200 | 157,600 | 674,700 | 10.4 |
| Ex. 4 | 15,100 | 169,300 | 727,400 | 11.2 |
| CE 1 | 17,800 | 136,500 | 477,300 | 7.68 |
| CE 2 | 16,800 | 137,400 | 413,200 | 8.17 |
| CE 3 | 17,700 | 107,600 | 362,600 | 6.08 |

TABLE 5

Absolute GPC calibration of Examples (Ex.) and Comparative Examples (CE).

| | Mw(abs) (g/mol) | Mz(abs) (g/mol) | Mz(abs)/Mw(abs) | Mw(abs)/Mw(conv) | LCBf | gpcBR |
|---|---|---|---|---|---|---|
| Ex. 1 | 439,400 | 5,098,000 | 11.6 | 2.74 | 3.46 | 3.01 |
| Ex. 2 | 446,200 | 5,267,000 | 11.8 | 2.79 | 3.70 | 3.10 |
| Ex. 3 | 442,200 | 5,126,000 | 11.6 | 2.81 | 3.56 | 3.12 |
| Ex. 4 | 488,100 | 5,663,000 | 11.6 | 2.88 | 4.04 | 3.24 |
| CE 1 | 305,900 | 3,760,000 | 12.3 | 2.24 | 2.55 | 2.18 |
| CE 2 | 244,500 | 1,133,000 | 4.64 | 1.78 | 2.58 | 1.84 |
| CE 3 | 217,300 | 3,676,000 | 16.9 | 2.02 | 2.25 | 1.70 |

TABLE 6

TDGPC-related properties related to IR, LS, and DV

| | $CDF_{IR}$ (MW below 10,000 g/mol) | $CDF_{LS}$ (MW above 750,000 g/mol) | $CDF_{DV}$ (MW above 1,200,000 g/mol) | IV (Abs) (g/dl) |
|---|---|---|---|---|
| Ex. 1 | 0.155 | 0.531 | 0.061 | 1.133 |
| Ex. 2 | 0.154 | 0.524 | 0.053 | 1.123 |
| Ex. 3 | 0.155 | 0.522 | 0.057 | 1.112 |
| Ex. 4 | 0.156 | 0.551 | 0.068 | 1.148 |
| CE 1 | 0.129 | 0.378 | 0.023 | 1.138 |
| CE 2 | 0.137 | 0.233 | 0.016 | 1.114 |
| CE 3 | 0.130 | 0.311 | 0.011 | 1.054 |

TABLE 7

Viscosities in Pa•s at 0.1, 1, 10, and 100 rad/s the viscosity ratio, and the tan delta at 190° C.

| | Visc 0.1 rad/s | Visc 1 rad/s | Visc 10 rad/s | Visc 100 rad/s | Visc. Ratio V.01/V100 | Tan Delta 0.1 rad/s |
|---|---|---|---|---|---|---|
| Ex. 1 | 35,240 | 11,797 | 3,158 | 721 | 48.86 | 1.30 |
| Ex. 2 | 33,726 | 11,557 | 3,127 | 719 | 46.88 | 1.34 |
| Ex. 3 | 32,278 | 11,217 | 3,069 | 712 | 45.34 | 1.37 |
| Ex. 4 | 40,514 | 13,040 | 3,372 | 751 | 53.92 | 1.20 |
| CE 1 | 53,324 | 16,903 | 4,230 | 916 | 58.21 | 1.21 |
| CE 2 | 35,769 | 12,527 | 3,410 | 783 | 45.65 | 1.39 |
| CE 3 | 42,113 | 15,001 | 4,049 | 917 | 45.91 | 1.48 |

TABLE 8

Branching results in branches per 1000 C. by $^{13}$C NMR

| Sample | C1 | 1,3 diethyl branches | C2 on Quat Carbon | C4 | C5 | C6+ |
|---|---|---|---|---|---|---|
| Ex. 1 | 0.37 | 4.48 | 1.47 | 6.82 | 2.14 | 3.5 |
| Ex. 2 | 0.44 | 4.59 | 1.58 | 6.8 | 2.1 | 3.3 |

TABLE 8-continued

Branching results in branches per 1000 C. by $^{13}$C NMR

| Sample | C1 | 1,3 diethyl branches | C2 on Quat Carbon | C4 | C5 | C6+ |
|---|---|---|---|---|---|---|
| Ex. 3 | 0.35 | 4.23 | 1.51 | 6.8 | 2.02 | 3.2 |
| Ex. 4 | 0.34 | 4.61 | 1.6 | 6.9 | 2.19 | 3.5 |
| CE 1 | 1.69 | 3.65 | 1.43 | 6.23 | 1.74 | 2.7 |
| CE 2 | ND | 3.73 | 1.44 | 6.58 | 2.16 | 3.3 |
| CE 3 | 2.6 | 3.41 | 1 | 6.13 | 1.74 | 2.3 |
| CE 4* | ND*** | ND | ND | ND | ND | 19.5[A] |
| CE 5** | ND | ND | ND | ND | ND | 114[A] |

[A]The values in the C6+ column for the DOWLEX and AFFINITY samples represent C6 branches from octene only, and do not include chain ends.
*AFFINITY PL 1880 available from The Dow Chemical Company.
**DOWLEX 2045G available from The Dow Chemical Company.
***ND = not detected.

TABLE 9

Unsaturation results by $^1$H NMR of Examples and Comparative Examples.

| | vinyl/ 1000 C. | cis and trans/ 1000 C. | trisub/ 1000 C. | vinylidene/ 1000 C. | total unsaturation/ 1000 C. |
|---|---|---|---|---|---|
| Ex. 1 | 0.074 | 0.046 | 0.1 | 0.217 | 0.44 |
| Ex. 2 | 0.058 | 0.044 | 0.067 | 0.196 | 0.36 |
| Ex. 3 | 0.059 | 0.037 | 0.067 | 0.202 | 0.36 |
| Ex. 4 | 0.061 | 0.043 | 0.065 | 0.209 | 0.38 |
| CE 1 | 0.127 | 0.035 | 0.042 | 0.162 | 0.37 |
| CE 2 | 0.037 | 0.033 | 0.062 | 0.148 | 0.28 |
| CE 3 | 0.17 | 0.04 | 0.026 | 0.13 | 0.36 |
| CE 4 | 0.04 | 0.064 | 0.123 | 0.043 | 0.27 |
| CE 5 | 0.283 | 0.049 | 0.042 | 0.055 | 0.43 |

TABLE 10

DSC results of Examples and Comparative Examples.

| | $T_m$ (° C.) | Heat of Fusion (J/g) | % Crystallinity | $T_c$ (° C.) |
|---|---|---|---|---|
| Ex. 1 | 110.2 | 141.5 | 48.5 | 98.8 |
| Ex. 2 | 110.0 | 144.7 | 49.6 | 98.9 |
| Ex. 3 | 110.1 | 146.1 | 50.0 | 98.8 |
| Ex. 4 | 109.7 | 143.4 | 49.1 | 98.9 |
| CE 1 | 109.2 | 139.9 | 47.9 | 98.1 |
| CE 2 | 110.0 | 142.5 | 48.8 | 98.5 |
| CE 3 | 109.2 | 144.0 | 49.3 | 97.3 |

Film Formulations

Blown films were made, and physical properties measured, with different LDPEs and one LLDPE1 (DOWLEX 2045G). LLDPE1 had a "1.0 melt index (MI or 12), and a 0.920 g/cc density." Films were made at 10 wt %, 20 wt %, and 50 wt % of the respective LDPE, based on the weight of the LDPE and LLDPE1. Each formulation was compounded on a MAGUIRE gravimetric blender. A polymer processing aid (PPA), DYNAMAR FX-5920A, was added to each formulation. The PPA was added at "1.125 wt % of masterbatch," based on the total weight of the weight of the formulation. The PPA masterbatch (Ingenia AC-01-01, available from Ingenia Polymers) contained 8 wt % of DYNAMAR FX-5920A in a polyethylene carrier. This amounts to 900 ppm PPA in the polymer. LLDPE1 was also used as the LLDPE in the films made at maximum output. Samples were run at maximum output with 80 wt % DOWLEX 2045G and 20 wt % LDPE and 90 wt % DOWLEX 2045G and 10 wt % LDPE.

Production of Blown Films

The monolayer blown films were made on an "8 inch die" with a polyethylene "Davis Standard Barrier II screw." External cooling by an air ring and internal bubble cooling were used. General blown film parameters, used to produce each blown film, are shown in Table 11. The temperatures are the temperatures closest to the pellet hopper (Barrel 1), and in increasing order, as the polymer was extruded through the die.

TABLE 11

Blown film fabrication conditions for films.

| Blow up ratio (BUR) | 2.5 |
|---|---|
| Film thickness (mil) | 2.0 |
| Die gap (mil) | 70 |
| Air temperature (° F.) | 45 |
| Temperature profile (° F.) | |
| Barrel 1 | 350 |
| Barrel 2 | 415 |
| Barrel 3 | 365 |
| Barrel 4 | 305 |
| Barrel 5 | 305 |
| Screen Temperature | 410 |
| Adapter | 410 |
| Block | 430 |
| Lower Die | 440 |
| Inner Die | 440 |
| Upper Die | 440 |

Production of Films for Determination of Maximum Output Rate of Blown Film

Film samples were made at a controlled rate and at a maximum rate. The controlled rate was 250 lb/hr, which equals an output rate of 10.0 lb/hr/inch of die circumference. The die diameter used for the maximum output trials was an 8 inch die, so that for the controlled rate, as an example, the conversion between "lb/hr" and "lb/hr/inch" of die circumference, is shown in Equation 15. Similarly, such an equation can be used for other rates, such as the maximum rate, by substituting the maximum rate in Equation 15 to determine the "lb/hr/inch" of die circumference.

$$\text{Lb/Hr/Inch of Die Circumference} = (250 \text{ Lb/Hr})/(8*\pi r) = 10 \quad \text{(EQN 15)}.$$

The maximum rate for a given sample was determined by increasing the output rate to the point where bubble stability was the limiting factor. The extruder profile was maintained for both samples (standard rate and maximum rate), however the melt temperature was higher for the maximum rate samples, due to the increased shear rate with higher motor speed (rpm, revolutions per minute). The maximum bubble stability was determined by taking the bubble to the point where it would not stay seated in the air ring. At that point, the rate was reduced to where the bubble was reseated in the air ring, and then a sample was collected. The cooling on the bubble was adjusted by adjusting the air ring and maintaining the bubble. This was taken as the maximum output rate, while maintaining bubble stability. Film properties are listed in Tables 12-14. As seen in these tables, the Inventive Examples when blended with LLDPE1, have excellent output (maximum output, shown at 10% and 20% LDPE) along with good optics/haze, dart, puncture, and tear. Thus, improved output is seen with the Inventive Examples, when blended with LLDPE1, while maintaining acceptable optics and toughness properties. Additionally, the Inventive Examples, when blended with LLDPE1, show good shrink properties (shrink tension, free shrink). Additionally, especially for Inventive Example 3, the screen pressure (in psi) is the lowest of any sample tested, showing the improved processability of this resin.

TABLE 12

Film properties of "100% LLDPE1" Film #1, and "90 wt % LLDPE1/10 wt % LDPE" Films #2-6, each made at 2 mil at a standard (std.) rate of 250 lb/hr. Note, the melt temperature, screen pressure and output were each measured at a maximum (max.) rate.

| Film | 1 | 2 | 3 | 4 | 5 | 6 |
|---|---|---|---|---|---|---|
| LDPE | NA | CE 3 | CE 1 | Ex. 3 | Ex. 4 | CE 2 |
| Thickness (mil) | 1.97 | 2.05 | 1.99 | 2.10 | 1.98 | 2.08 |
| Melt Index $I_2$ | 1.01 | 0.92 | 0.80 | 0.94 | 0.86 | 0.81 |
| Melt Index Ratio $I_{10}/I_2$ | 7.76 | 7.87 | 8.27 | 7.53 | 8.01 | 8.12 |
| Density (g/cc) | 0.922 | 0.923 | 0.923 | 0.923 | 0.923 | 0.923 |
| Haze (%) | 11.1 | 7.7 | 7.7 | 8.6 | 8.8 | 7.8 |
| Haze Internal (%) | 4.6 | 3.4 | 3.4 | 3.2 | 3.2 | 3.1 |
| Gloss (45°) | 55.8 | 66.9 | 68.7 | 62.6 | 61.1 | 66.7 |
| Clarity (%) | 98.6 | 99.2 | 99.0 | 97.8 | 97.5 | 98.4 |
| Dart (g) | 412 | 367 | 331 | 334 | 310 | 310 |
| Puncture (ft-$lb_f$/in$^3$) | 183 | 207 | 186 | 189 | 213 | 187 |
| MD Tear (g) | 842 | 599 | 602 | 627 | 612 | 542 |
| CD Tear (g) | 1,092 | 1,353 | 1,312 | 1,250 | 1,255 | 1,352 |
| MD Normalized Tear (g/mil) | 442 | 301 | 307 | 321 | 313 | 277 |
| CD Normalized Tear (g/mil) | 561 | 691 | 667 | 637 | 652 | 685 |
| 2% MD Secant Modulus (psi) | 27,316 | 29,254 | 27,850 | 28,407 | 29,218 | 27,834 |
| 2% CD Secant Modulus (psi) | 32,440 | 31,868 | 30,679 | 32,482 | 34,791 | 33,266 |
| MD Free Shrink (%) | 60.2 | 71.5 | 72.5 | 72.0 | 71.0 | 73.4 |
| CD Free Shrink (%) | 7.5 | 2.6 | 1.6 | 1.6 | 4.5 | 3.1 |
| MD Shrink Tension (psi) | 2.71 | 5.77 | 6.33 | 6.99 | 5.80 | 7.93 |
| CD Shrink Tension (psi) | 0.52 | 0.48 | 0.53 | 0.40 | 0.54 | 0.45 |
| Frost Line Height (inches) | 30 | 30 | 31 | 31 | 31 | 33 |
| Melt Temperature (° F.) | 409 | 407 | 409 | 408 | 408 | 408 |
| Screen Pressure (psi) | 3,610 | 3,360 | 3,530 | 3,270 | 3,430 | 3,490 |
| Standard output (lb/hr) | 248 | 251 | 253 | 250 | 252 | 250 |
| Frost Line Height (inches), Max Output | 52 | 67 | 82 | 77 | 85+ | 33 |
| Melt Temperature (° F.), Max Output | 422 | 431 | 442 | 440 | 446 | 444 |
| Screen Pressure (psi), Max Output | 3,980 | 4,080 | 4,470 | 4,660 | 4,620 | 4,450 |
| Output (lb/hr), Max Output | 319 | 395 | 429 | 428 | 455 | 444 |

TABLE 13

Film properties of "80 wt % LLDPE1/20 wt % LDPE" Films #7-11, each made at 2 mil at a standard (std.) rate of 250 lb/hr; note the melt temperature, screen pressure and output were each measured at a maximum (max.) rate.

| Film | 7 | 8 | 9 | 10 | 11 |
|---|---|---|---|---|---|
| LDPE | CE 3 | CE 1 | Ex. 3 | Ex. 4 | CE 2 |
| Thickness (mil) | 2.04 | 1.90 | 1.97 | 2.02 | 1.97 |
| Melt Index $I_2$ | 0.74 | 0.68 | 0.78 | 0.72 | 0.78 |
| Melt Index Ratio $I_{10}/I_2$ | 8.50 | 9.34 | 8.47 | 8.73 | 8.73 |
| Density (g/cc) | 0.923 | 0.922 | 0.923 | 0.922 | 0.923 |
| Film | 7 | 8 | 9 | 10 | 11 |
| Haze (%) | 7.9 | 8.2 | 9.3 | 13.4 | 7.7 |
| Haze Internal (%) | 2.8 | 2.5 | 2.6 | 2.4 | 2.5 |
| Gloss (45°) | 63.1 | 61.5 | 57.3 | 43.6 | 62.9 |
| Clarity (%) | 97.3 | 95.4 | 94.4 | 85.7 | 95.6 |
| Dart (g) | 283 | 295 | 286 | 271 | 283 |
| Puncture (ft-$lb_f$/in$^3$) | 183 | 183 | 171 | 164 | 182 |
| MD Tear (g) | 430 | 355 | 440 | 361 | 403 |
| CD Tear (g) | 1,397 | 1,258 | 1,250 | 1,107 | 1,204 |
| MD Normalized Tear (g/mil) | 212 | 183 | 220 | 187 | 216 |
| CD Normalized Tear (g/mil) | 703 | 648 | 656 | 578 | 644 |
| 2% MD Secant Modulus (psi) | 28,902 | 28,398 | 27,486 | 27,410 | 27,138 |
| 2% CD Secant Modulus (psi) | 34,496 | 26,953 | 33,753 | 33,137 | 31,665 |
| MD Free Shrink (%) | 73.4 | 75.9 | 72.5 | 75.4 | 76.9 |
| CD Free Shrink (%) | 3.5 | 0.6 | 3.6 | 8.5 | 3.1 |
| MD Shrink Tension (psi) | 9.60 | 11.43 | 8.88 | 12.28 | 10.22 |
| CD Shrink Tension (psi) | 0.27 | 0.46 | 0.35 | 0.38 | 0.37 |
| Frost Line Height (inches) | 31 | 30 | 30 | 29 | 29 |
| Melt Temperature (° F.) | 410 | 408 | 409 | 407 | 407 |
| Screen Pressure (psi) | 3,730 | 3,650 | 3,190 | 3,760 | 3,700 |
| Standard Output (lb/hr) | 254 | 250 | 252 | 253 | 251 |
| Frost Line Height (inches), Max Output | 60 | 80 | 70 | 90 | 90 |
| Melt Temperature (° F.), Max Output | 440 | 448 | 450 | 454 | 454 |

TABLE 13-continued

Film properties of "80 wt % LLDPE1/20 wt % LDPE" Films #7-11, each made at 2 mil at a standard (std.) rate of 250 lb/hr; note the melt temperature, screen pressure and output were each measured at a maximum (max.) rate.

| Film | 7 | 8 | 9 | 10 | 11 |
|---|---|---|---|---|---|
| Screen Pressure (psi), Max Output | 4,480 | 4,630 | 4,550 | 4,620 | 4,370 |
| Output (lb/hr), Max Output | 430 | 483 | 501* | 535** | 541 |

*Ran out of sample; max rate higher than reported in table.
**Stopped due to no BUR control; max rate higher than reported in the table.

TABLE 14

Film properties of "50 wt % LLDPE1/50 wt % LDPE" Films #12-16, each made at 2 mil at a standard (std.) rate of 250 lb/hr.

| Film | 12 | 13 | 14 | 15 | 16 |
|---|---|---|---|---|---|
| LDPE | CE 3 | CE 1 | Ex. 3 | Ex. 4 | CE 2 |
| Thickness (mil) | 1.94 | 2.05 | 1.90 | 1.96 | 2.07 |
| Melt Index $I_2$ | 0.49 | 0.39 | 0.47 | 0.45 | 0.44 |
| Melt Index Ratio $I_{10}/I_2$ | 10.78 | 11.43 | 11.17 | 10.49 | 10.91 |
| Density (g/cc) | 0.923 | 0.922 | 0.923 | 0.922 | 0.923 |
| Haze (%) | 10.6 | 11.7 | 20.0 | 24.1 | 14.8 |
| Haze Internal (%) | 1.8 | 1.6 | 1.7 | 1.5 | 1.5 |
| Gloss (45°) | 50.7 | 47.0 | 30.5 | 24.7 | 37.5 |
| Clarity (%) | 89.7 | 87.5 | 74.0 | 68.3 | 80.4 |
| Dart (g) | 229 | 250 | 223 | 214 | 232 |
| Puncture (ft-lb/in³) | 149 | 124 | 133 | 128 | 124 |
| MD Tear (g) | 140 | 127 | 131 | 124 | 116 |
| CD Tear (g) | 1,037 | 1,116 | 943 | 997 | 1,056 |
| MD Normalized Tear (g/mil) | 71 | 64 | 66 | 61 | 59 |
| CD Normalized Tear (g/mil) | 527 | 557 | 472 | 492 | 540 |
| 2% MD Secant Modulus (psi) | 30,004 | 28,861 | 28,908 | 30,226 | 31,238 |
| 2% CD Secant Modulus (psi) | 35,270 | 33,848 | 36,114 | 37,603 | 38,741 |
| MD Free Shrink (%) | 81.8 | 82.3 | 80.8 | 81.8 | 83.3 |
| CD Free Shrink (%) | 15.4 | 15.4 | 18.3 | 14.4 | 14.9 |
| MD Shrink Tension (psi) | 26.93 | 35.60 | 27.98 | 33.03 | 36.45 |
| CD Shrink Tension (psi) | 0.47 | 0.67 | 0.41 | 0.51 | 0.51 |
| Frost Line Height (inches) | 28 | 28 | 25 | 24 | 26 |
| Melt Temperature (° F.) | 417 | 417 | 414 | 417 | 418 |
| Screen Pressure (psi) | 3,730 | 3,710 | 3,480 | 3,730 | 3,890 |
| Standard Output (lb/hr) | 301 | 301 | 302 | 301 | 300 |

The invention claimed is:

1. A composition comprising an ethylene-based polymer, wherein the ethylene-based polymer comprises the following properties:
   a) a Mw(abs)/Mw(conv) ≥2.60; and
   b) a $CDF_{IR}$ (at MW ≤10,000 g/mole) ≥0.145,
   wherein
   Mw(abs) is weight average molecular weight determined by Gel Permeation Chromatography (GPC) using a low angle laser light scattering (LALLS) detector;
   Mw(conv) is weight average molecular weight determined by conventional GPC molecular weight calibration; and
   $CDF_{IR}$ (at MW ≤10,000 g/mole) is an infrared cumulative detector fraction computed by measuring an area fraction of a GPC IR5 measurement channel (IR) detector chromatogram at less than 10,000 g/mol.

2. The composition of claim 1, wherein the ethylene-based polymer has a $CDF_{DV}$ (at a MW ≥1.2×10⁶ g/mol) ≥0.05, wherein $CDF_{DV}$ (at a MW≥1.2×10⁶ g/mol) is a cumulative detector fraction from the viscosity detector computed by measuring an area fraction of a GPC viscosity chromatogram at greater than 1.2×10⁶ g/mol.

3. The composition of claim 1, wherein the ethylene-based polymer has an IV (intrinsic viscosity) (units=dl/g) ≥1.00 dl/g, intrinsic viscosity (Absolute by viscometer on-line by GPC) or IV (bulk).

4. The composition of claim 1, wherein the ethylene-based polymer has an Mw(abs) from 400,000 g/mol to 600,000 g/mol.

5. The composition of claim 1, wherein the ethylene-based polymer has a $CDF_{LS}$ (at MW ≥750,000 g/mol) ≥0.45, wherein the $CDF_{LS}$ is computed by measuring the area fraction of a GPC LALLS detector chromatogram at greater than 750,000 g/mol.

6. The composition of claim 1, wherein the ethylene-based polymer has a "peak melt strength at 190° C." greater than "−65*($I_2$ at 190° C.)+34 cN" and less than "−65*($I_2$ at 190° C.)+43 cN", wherein $I_2$ is measured according to ASTM D1238 at 190° C. and a 2.16 kg load.

7. The composition of claim 1, wherein the ethylene-based polymer has Mw(conv)/Mn(conv) (cc-GPC Mw/Mn) from 9 to 13, wherein Mn(conv) is number average molecular weight determined by conventional GPC molecular weight calibration.

8. The composition of claim 1, wherein the ethylene-based polymer has a melt index ($I_2$) from 0.01 to 1.00 g/10 min when measured according to ASTM D1238 at 190° C. and a 2.16 kg load.

9. The composition of claim 1, wherein the ethylene-based polymer is a low density polyethylene (LDPE).

10. An article comprising at least one component formed from the composition of claim 1.

* * * * *